(12) United States Patent
Mizuhashi et al.

(10) Patent No.: US 9,430,086 B2
(45) Date of Patent: Aug. 30, 2016

(54) DISPLAY PANEL, DRIVER CIRCUIT, DRIVING METHOD, AND ELECTRONIC APPARATUS

(71) Applicant: JAPAN DISPLAY INC., Tokyo (JP)

(72) Inventors: Hiroshi Mizuhashi, Kanagawa (JP); Yoshitoshi Kida, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/678,281

(22) Filed: Apr. 3, 2015

(65) Prior Publication Data

US 2015/0212645 A1 Jul. 30, 2015

Related U.S. Application Data

(63) Continuation of application No. 13/718,634, filed on Dec. 18, 2012, now Pat. No. 9,030,431.

(30) Foreign Application Priority Data

Jan. 23, 2012 (JP) ................. 2012-010743

(51) Int. Cl.
*G06F 3/041* (2006.01)
*G06F 3/044* (2006.01)
*G02F 1/1333* (2006.01)

(52) U.S. Cl.
CPC ......... *G06F 3/0416* (2013.01); *G02F 1/13338* (2013.01); *G06F 3/044* (2013.01); *G06F 3/0412* (2013.01); *G06F 2203/04112* (2013.01)

(58) Field of Classification Search
CPC ............... G06F 3/041–3/0412; G06F 3/0416; G06F 3/0418; G06F 3/044; G06F 3/047; G09G 3/3655
See application file for complete search history.

(56) References Cited

U.S. PATENT DOCUMENTS

| | | | |
|---|---|---|---|
| 6,970,160 B2 | 11/2005 | Mulligan et al. | |
| 2011/0210927 A1* | 9/2011 | Mizuhashi | G06F 3/044 345/173 |
| 2013/0009934 A1* | 1/2013 | Nakamizo | G09G 3/3655 345/211 |

FOREIGN PATENT DOCUMENTS

| | | |
|---|---|---|
| JP | 08-123370 A | 5/1996 |
| JP | 2006-511879 | 4/2006 |
| JP | 2008-009368 A | 1/2008 |
| JP | 2009-258182 | 11/2009 |
| JP | 2011-233018 A | 11/2011 |
| JP | 2012-008910 A | 1/2012 |

(Continued)

OTHER PUBLICATIONS

Office Action issued in connection with Japanese Patent Application No. 2012-010743, mailed Mar. 31, 2015. (9 pages).

(Continued)

*Primary Examiner* — Liliana Cerullo
(74) *Attorney, Agent, or Firm* — K&L Gates LLP

(57) ABSTRACT

A display panel includes: display elements; a plurality of drive electrodes; one or more touch detecting electrodes that form a capacitor along with the corresponding drive electrode; a main driver unit that generates a basic drive signal including a pulse part supplied to the drive electrodes; and a first auxiliary driver unit that includes a capacitive element and that exchanges electric charges between the capacitive element and the drive electrodes in synchronization with the pulse part.

12 Claims, 25 Drawing Sheets

(56) References Cited

FOREIGN PATENT DOCUMENTS

| TW | 201131452 | 9/2011 | | |
|---|---|---|---|---|
| WO | WO 2011104959 A1 | * | 9/2011 | ............ G09G 3/3655 |

OTHER PUBLICATIONS

Office Action issued in connection with Taiwan Patent Application No. 101142521, mailed Nov. 20, 2014. (14 pages).

* cited by examiner

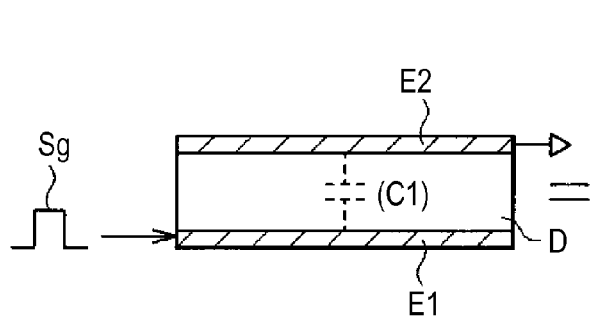
FIG.1A
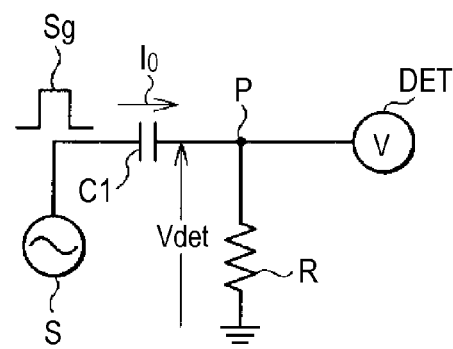
FIG.1B
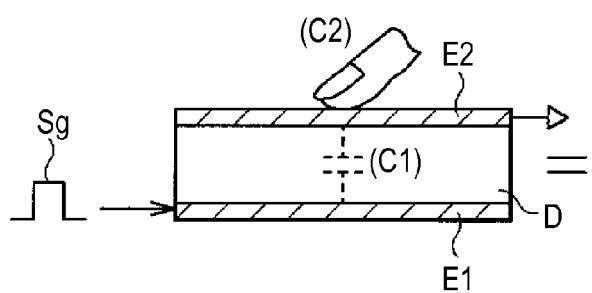
FIG.2A
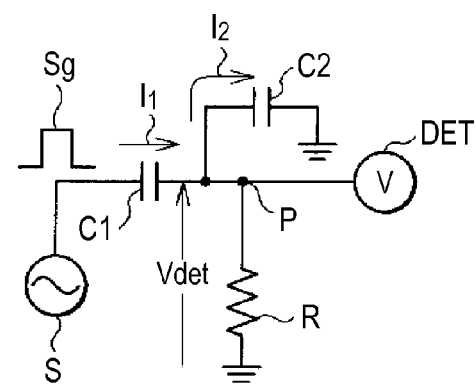
FIG.2B
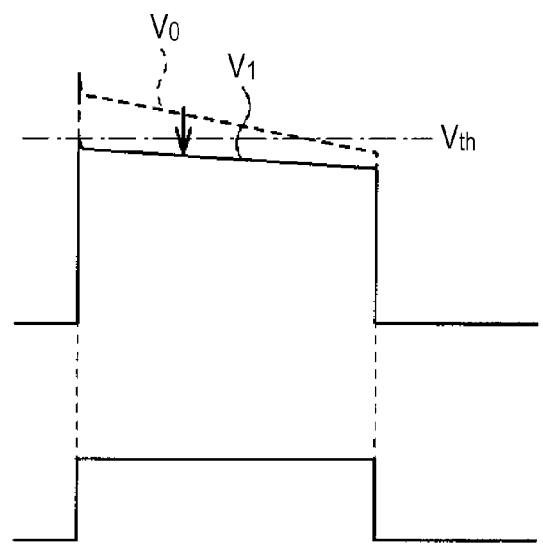
FIG.3A
FIG.3B

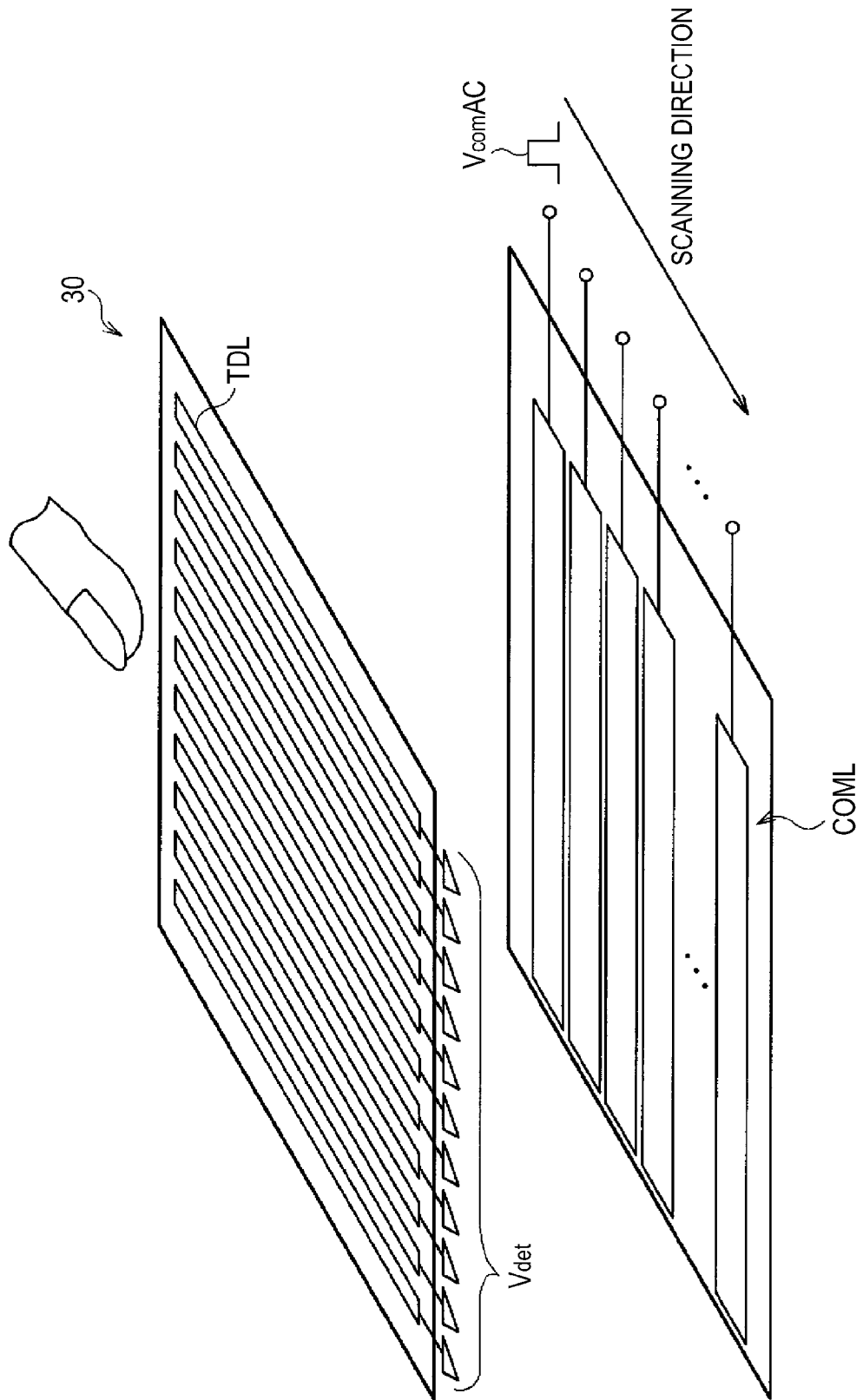

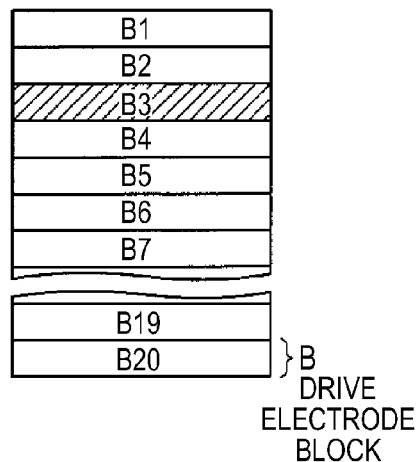
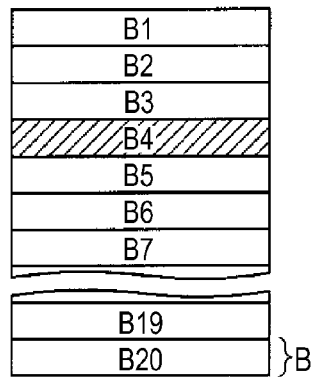
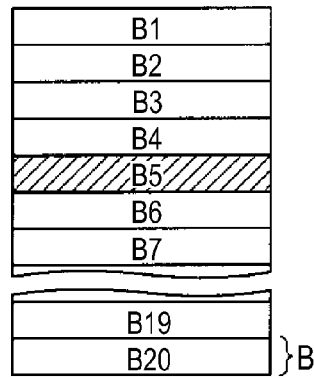
FIG.9A    FIG.9B    FIG.9C
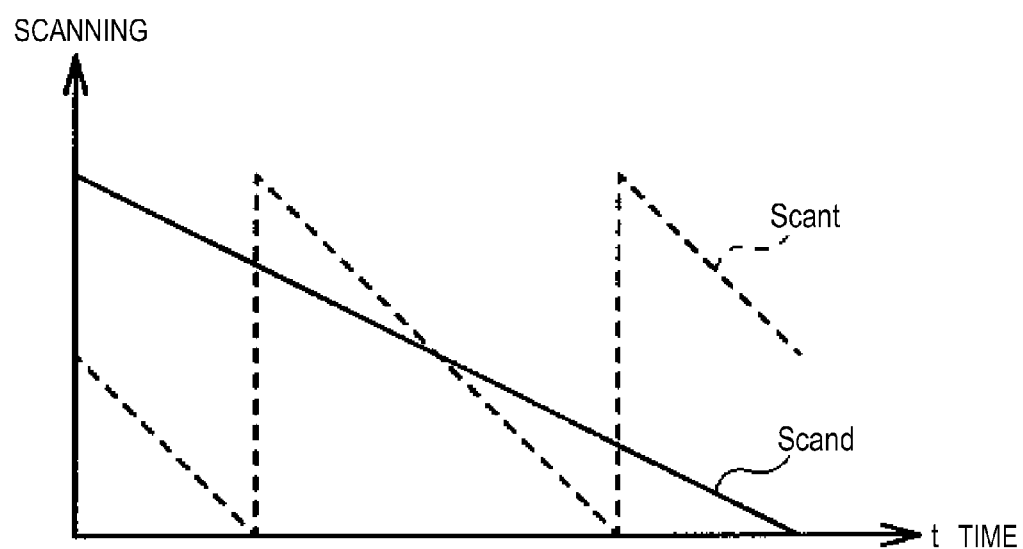
FIG.10

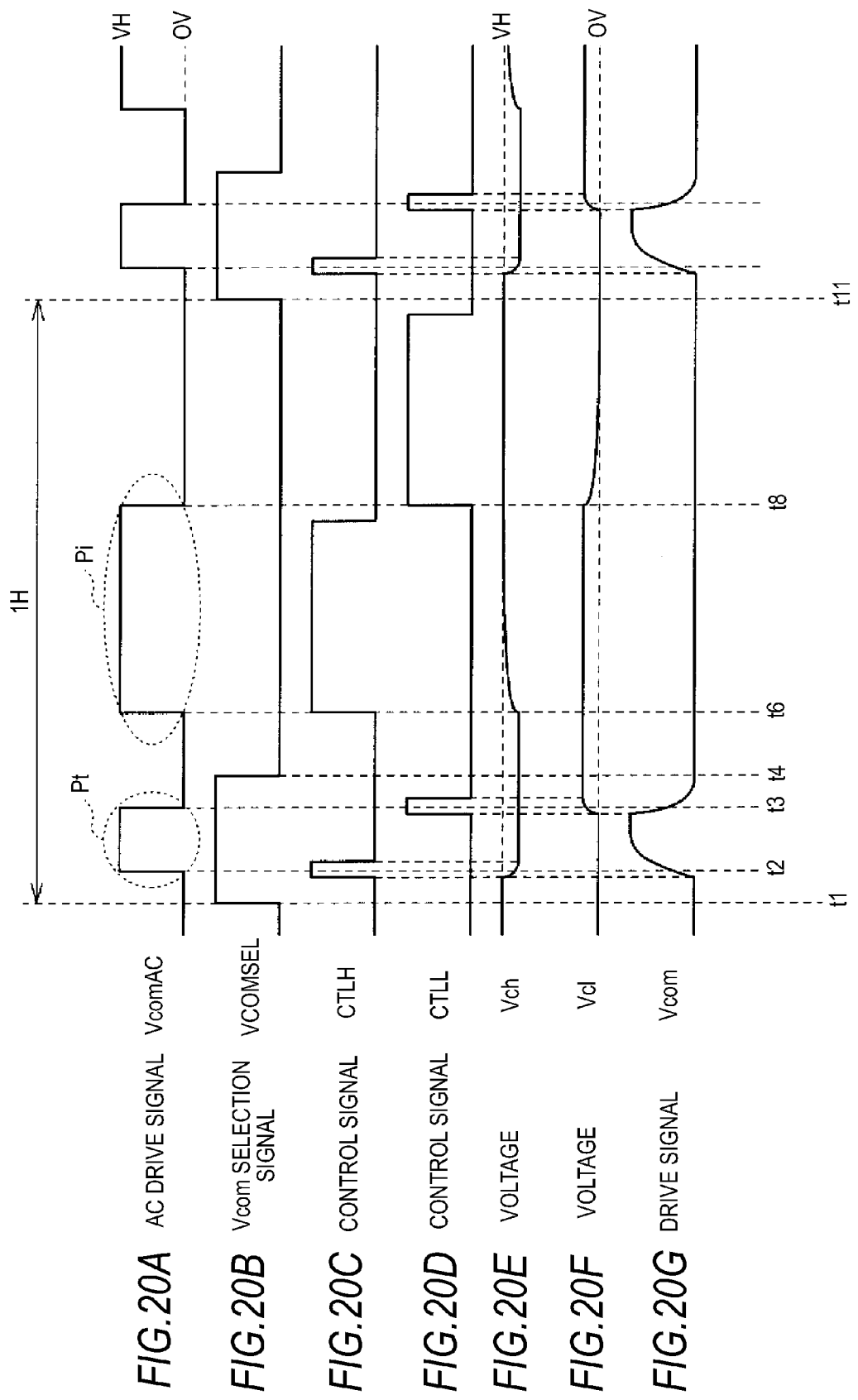

DISPLAY PANEL, DRIVER CIRCUIT, DRIVING METHOD, AND ELECTRONIC APPARATUS

CROSS REFERENCES TO RELATED APPLICATIONS

The present application is a continuation of U.S. patent application Ser. No. 13/718,634, filed Dec. 18, 2012, which claims priority to Japanese Priority Patent Application JP 2012-010743 filed in the Japan Patent Office on Jan. 23, 2012, the entire content of which is hereby incorporated by reference.

BACKGROUND

The present disclosure relates to a display panel having a function of detecting a touch of an external adjacent object, a driver circuit and a driving method used in such a display panel, and an electronic apparatus having such a display panel.

Recently, a display panel which allows an input of information instead of using normal mechanical buttons by mounting a touch detecting device called a touch panel on a display panel such as a liquid crystal display panel or incorporating a touch panel and a display panel into a body and displaying various button images on the display panel has attracted attention. Such a display panel having a touch detecting function does not employ an input device such as a keyboard, a mouse, and a keypad and thus has been increasingly used for portable information terminals such as mobile phones in addition to computers.

Touch panels are classified into several types such as an optical type, a resistance type, and a capacitance type. For example, JP-T-2006-511879 proposes a capacitance type touch panel in which plural electrodes extending in a direction are arranged to cross each other. In the touch panel, the electrodes are connected to a control circuit and are supplied with an excitation current from the control circuit to detect an external adjacent object.

For example, JP-A-2009-258182 proposes a so-called in-cell display panel in which a common electrode for display originally disposed in a display panel is used together as one electrode of a pair of touch-sensor electrodes and the other electrode (touch detecting electrode) is arranged to cross the common electrode. Several kinds of so-called on-cell display panels in which a touch panel is formed on a display surface of a display panel have been proposed.

SUMMARY

However, recently, increases in precision or size of a display panel have progressed. For example, when a display panel and a touch panel are made to operate in synchronization with each other, the ratio of the writing period of a pixel signal in one frame period increases with an increase in the number of horizontal lines and thus the time to detect a touch is shortened. Accordingly, it is necessary for the touch panel to perform a touch detecting operation for a short time while maintaining touch detection accuracy which is the original objective.

It is therefore desirable to provide a display panel, a driver circuit, a driving method, and an electronic apparatus, which can detect a touch for a short time while suppressing a decrease in touch detection accuracy.

An embodiment of the present disclosure is directed to a display panel including display elements, plural drive electrodes, one or more touch detecting electrodes, a main driver unit, and a first auxiliary driver unit. The one or more touch detecting electrodes form a capacitor along with the corresponding drive electrode. The main driver unit generates a basic drive signal including a pulse part supplied to the drive electrodes. The first auxiliary driver unit includes a capacitive element and exchanges electric charges between the capacitive element and the drive electrodes in synchronization with the pulse part.

Another embodiment of the present disclosure is directed to a driver circuit including a capacitive element and causing electric charges to be exchanged between the capacitive element and a drive electrode in synchronization with a pulse part, which is supplied to the drive electrode, of a basic drive signal.

Still another embodiment of the present disclosure is directed to a driving method including supplying a pulse part of a basic drive signal to a drive electrode, and exchanging electric charges between a capacitive element and the drive electrode in synchronization with the pulse part.

Yet another embodiment of the present disclosure is directed to an electronic apparatus including the above-mentioned display panel and examples thereof include a television set, a digital camera, a personal computer, a video camera, and a portable terminal such as a mobile phone.

In the display panel, the driver circuit, the driving method, and the electronic apparatus according to the embodiments of the present disclosure, the pulse part of the basic drive signal is applied to the plural drive electrodes and the pulse part is transmitted to the touch detecting electrode via the capacitor. At this time, electric charges are exchanged between the capacitive element and the drive electrodes in synchronization with the pulse part.

In the display panel, the driver circuit, the driving method, and the electronic apparatus according to the embodiments of the present disclosure, since electric charges are exchanged between the capacitive element and the drive electrodes in synchronization with a pulse part, it is possible to detect a touch for a short time while suppressing a decrease in touch detection accuracy.

Additional features and advantages are described herein, and will be apparent from the following Detailed Description and the figures.

BRIEF DESCRIPTION OF THE FIGURES

FIGS. 1A and 1B are diagrams illustrating the fundamental principle of a touch detection system in a display panel according to an embodiment of the present disclosure and shows a state where a finger does not touch nor approach the display panel;

FIGS. 2A and 2B are diagrams illustrating the fundamental principle of the touch detection system in the display panel according to the embodiment of the present disclosure and shows a state where a finger touches or approaches the display panel;

FIGS. 3A and 3B are diagrams illustrating the fundamental principle of the touch detection system in the display panel according to the embodiment of the present disclosure and shows examples of waveforms of a drive signal and a touch detection signal;

FIG. 8 is a perspective view illustrating configuration examples of a drive electrode and a touch detection electrode in a touch detecting device shown in FIG. 4;

FIGS. 9A to 9C are schematic diagrams illustrating an operational example of a touch detection scanning operation in the display panel shown in FIG. 4;

FIG. 10 is a schematic diagram illustrating an operational example of a display scanning operation and a touch detection scanning operation in the display panel shown in FIG. 4;

FIGS. 20A to 20G are timing waveform diagrams illustrating an operational example of an auxiliary driver unit according to a modified example of the first embodiment;

DETAILED DESCRIPTION

Figure 4:
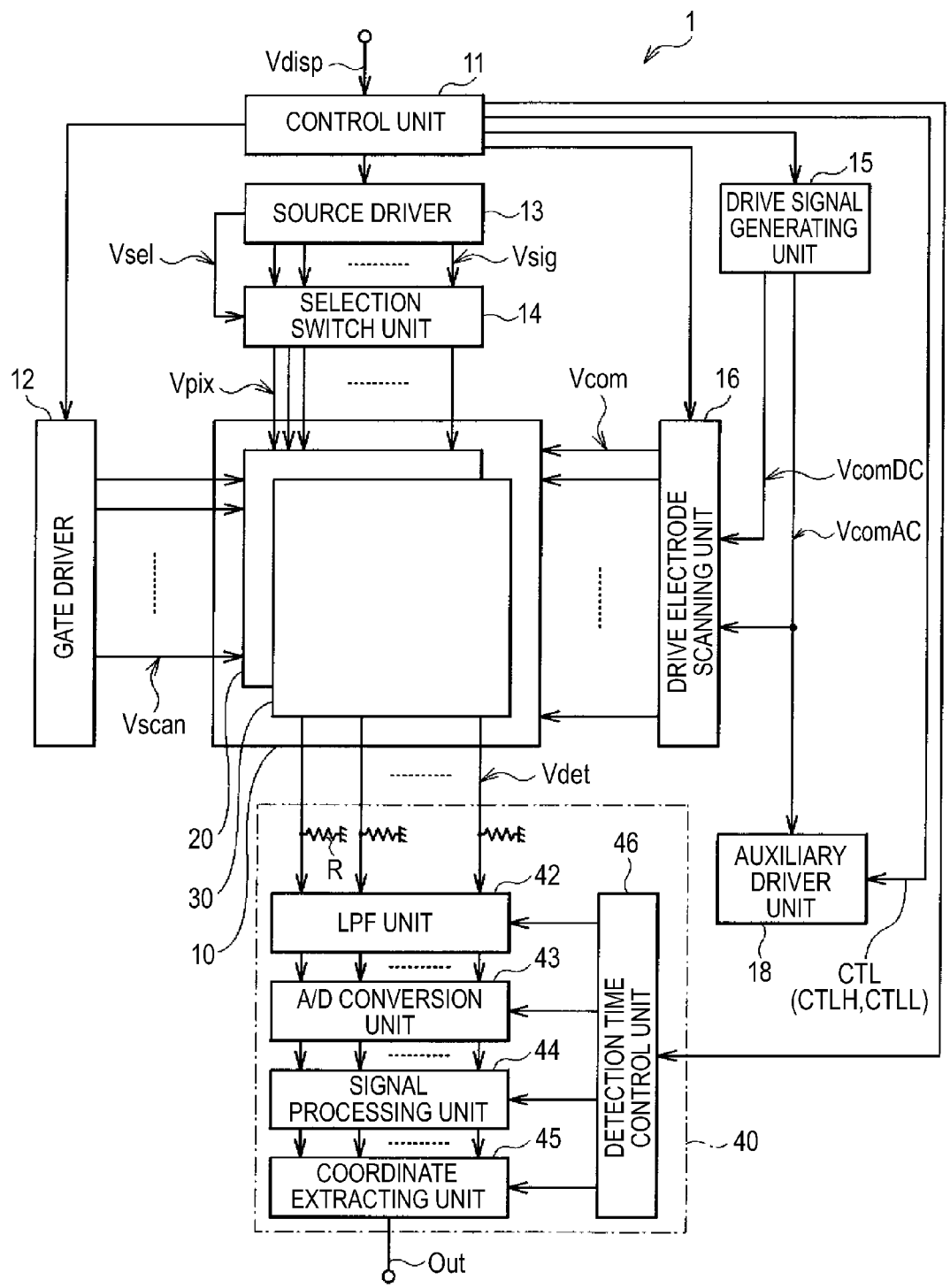
FIG. 4 is a block diagram illustrating a configuration example of a display panel according to a first embodiment of the present disclosure.

Hereinafter, embodiments of the present disclosure will be described in detail with reference to the accompanying drawings. The description may be made in the following order.

1. Fundamental Principle of Capacitance Type Touch Detection
2. First Embodiment
3. Second Embodiment
4. Third Embodiment
5. Application Examples <1. Fundamental Principle of Capacitance Type Touch Detection>

First, the fundamental principle of touch detection in a display panel according to an embodiment of the present disclosure will be described with reference to FIGS. 1A to 3B. This touch detection system is embodied as a capacitance type touch sensor and a capacitive element is constructed using a pair of electrodes (a drive electrode E1 and a touch detecting electrode E2) disposed to face each other with a dielectric D interposed therebetween, for example, as shown in FIG. 1A. This structure is expressed by an equivalent circuit shown in FIG. 1B. The drive electrode E1, the touch detecting electrode E2, and the dielectric D constitute a capacitive element C1. One end of the capacitive element C1 is connected to an AC signal source (a drive signal source) S, and the other end P thereof is grounded via a resistor R and is connected to a voltage detector (a touch detecting circuit) DET. When an AC rectangular wave Sg (FIG. 3B) of a predetermined frequency (for example, several kHz to several tens of kHz) is applied to the drive electrode E1 (one end of the capacitive element C1) from the AC signal source S, an output waveform (a touch detection signal Vdet) appears at the touch detecting electrode E2 (the other end P of the capacitive element C1), as shown in FIG. 3A.

In a state where a finger does not touch (or approach) the capacitive element, as shown in FIGS. 1A and 1B, a current I0 flows based on the capacitance value of the capacitive element C1 with charging and discharging of the capacitive element C1. The potential waveform of the other end P of the capacitive element C1 at this time is the same as the waveform V0 shown, for example, in FIG. 3A and is detected by the voltage detector DET.

On the other hand, in a state where a finger touches (or approaches) the capacitive element, as shown in FIGS. 2A and 2B, a capacitive element C2 formed by the finger is added in series to the capacitive element C1. In this state, currents I1 and I2 flow with the charging and discharging of the capacitive elements C1 and C2. The potential waveform of the other end P of the capacitive element C1 at this time is the same as the waveform V1 shown, for example, in FIG. 3A and is detected by the voltage detector DET. At this time, the potential of the point P is a partial potential determined by the values of currents I1 and I2 flowing in the capacitive elements C1 and C2. Accordingly, the waveform V1 has a value smaller than that of the waveform V0 in the non-touched state. The voltage detector DET compares the detected voltage with a predetermined threshold voltage Vth, determines that it is in a non-touched state when the detected voltage is higher than or equal to the threshold voltage, and determines that it is in a touched state when the detected voltage is less than the threshold voltage. In this way, it is possible to detect a touch.

<2. First Embodiment>
[Configuration Example]
(Overall Configuration)

FIG. 4 is a diagram illustrating a configuration example of a display panel according to a first embodiment. This display panel 1 is a so-called in-cell display panel in which a liquid crystal display device and a capacitance type touch detecting device are incorporated into a body.

The display panel 1 includes a control unit 11, a gate driver 12, a source driver 13, a selection switch unit 14, a drive signal generating unit 15, a drive electrode scanning unit 16, an auxiliary driver unit 18, a display device with a touch detecting function 10, and a touch detecting unit 40.

The control unit 11 is a circuit that supplies a control signal to the gate driver 12, the source driver 13, the drive signal generating unit 15, the drive electrode scanning unit 16, the auxiliary driver unit 18, and the touch detecting unit 40 on the basis of an image signal Vdisp and controls the units to operate in synchronization with each other.

The gate driver 12 has a function of sequentially selecting one horizontal line which is a target of a display driving operation of the display device with a touch detecting function 10 on the basis of the control signal supplied from the control unit 11. Specifically, the gate driver 12 generates a scanning signal Vscan on the basis of the control signal supplied from the control unit 11 and supplies the scanning signal Vscan to the gates of TFT elements Tr of pixels Pix via scanning signal lines GCL, whereby one line (one horizontal line) of pixels Pix which are formed in a matrix on the liquid crystal display device 20 of the display device with a touch detecting function 10 is sequentially selected as a display driving target.

The source driver 13 serves to generate and output a pixel signal Vsig on the basis of an image signal and a source driver control signal supplied from the control unit 11. Specifically, as described later, the source driver 13 generates pixel signals Vsig, which are obtained by multiplexing pixel signals Vpix of plural (three in this example) sub pixels SPix of the liquid crystal display device 20 of the display device with a touch detecting function 10 in a time-divisional manner, from the image signal corresponding to one horizontal line and supplies the generated pixel signals to the selection switch unit 14. The source driver 13 also has a function of generating switch control signals Vsel (VselR, VselG, and VselB) necessary for separating the pixel signals Vpix multiplexed into the pixel signals Vsig and supplying the generated switch control signals to the selection switch unit 14 along with the pixel signals Vsig. This multiplexing is carried out to reduce the number of lines between the source driver 13 and the selection switch unit 14.

The selection switch unit 14 separates the pixel signals Vpix, which are multiplexed into the pixel signals Vsig on the basis of the pixel signals Vsig and the switch control signal Vsel supplied from the source driver 13, and supplies the separated pixel signals to the liquid crystal display device 20 of the display device with a touch detecting function 10.

Figure 5:
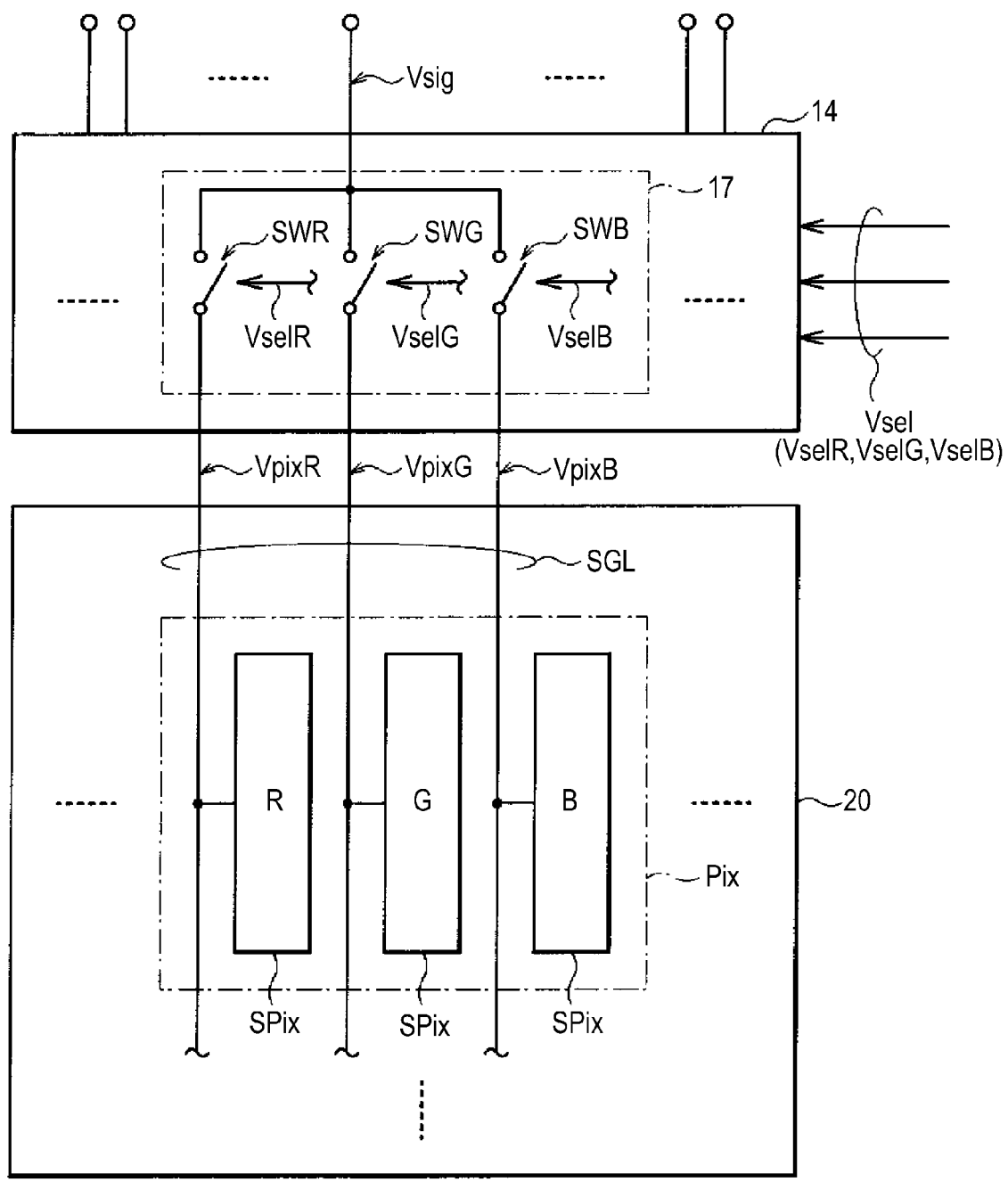
FIG. 5 is a block diagram illustrating a configuration example of a selection switch unit shown in FIG. 4.

FIG. 5 shows a configuration example of the selection switch unit 14. The selection switch unit 14 includes plural switch groups 17. In this example, each switch group 17 includes three switches SWR, SWG, and SWB. An end of each of the switches is connected and is supplied with the pixel signal Vsig from the source driver 13, and the other ends thereof are connected to the three sub pixels SPix (R, G, and B) of a pixel Pix via a pixel signal line SGL of the liquid crystal display device 20 of the display device with a touch detecting function 10. ON and OFF states of the three switches SWR, SWG, and SWB are controlled by the switch control signals Vsel (VselR, VselG, and VselB) supplied from the source driver 13. According to this configuration, the selection switch unit 14 serves to separate the pixel signals Vpix (VpixR, VpixG, and VpixB) from the multiplexed pixel signal Vsig by sequentially turning on the three switches SWR, SWG, and SWB in a time-divisional manner in response to the switch control signals Vsel. The selection switch unit 14 supplies the pixel signals Vpix to the three sub pixels SPix.

The drive signal generating unit 15 generates a DC drive signal VcomDC and an AC drive signal VcomAC and supplied the generated drive signals to the drive electrode scanning unit 16. In this example, the DC drive signal VcomDC is a DC signal with a voltage of 0 V. The AC drive signal VcomAC is a signal including two pulses Pt and Pi with a low-level voltage of 0 V and a high-level voltage of VH. As described later, the pulse Pt is supplied to the drive electrodes COML and the pulse Pi is used to initialize the auxiliary driver unit 18.

The drive electrode scanning unit 16 is a circuit that selects one of the DC drive signal VcomDC and the AC drive signal VcomAC supplied from the drive signal generating unit 15 on the basis of the control signal supplied from the control unit 11 and that supplies the selected drive signal as a drive signal Vcom to the drive electrodes COML (to be described later) of the display device with a touch detecting function 10. Specifically, the drive electrode scanning unit 16 supplies the DC drive signal VcomDC to the drive electrodes COML in a display operation. In a touch detecting operation, the drive electrode scanning unit 16 supplies the pulse Pt of the AC drive signal VcomAC to the drive electrodes COML associated with the touch detecting operation and supplies the DC drive signal VcomDC to the other drive electrodes COML. At this time, the drive electrode scanning unit 16 supplies the drive signal Vcom to each block (drive electrode block B to be described later) including a predetermined number of drive electrodes COML.

The auxiliary driver unit 18 is a circuit that assists the driving operation of the drive signal generating unit 15 on the basis of the control signals CTL (CTLH and CTLL) supplied from the control unit 11. Specifically, as described later, the auxiliary driver unit 18 assists the driving operation of the drive signal generating unit 15 so as to reduce the transition time (the rising time tr and the falling time tf) of the drive signal Vcom (pulse Pt) supplied to the drive electrodes COML via the drive electrode scanning unit 16.

The display device with a touch detecting function 10 is a display device having a touch detecting function. The display device with a touch detecting function 10 includes a liquid crystal display device 20 and the touch detecting device 30. The liquid crystal display device 20 is a device that sequentially scans each horizontal line and performs a display operation on the basis of the scanning signal Vscan supplied from the gate driver 12 as described later. The touch detecting device 30 serves to operate on the basis of the fundamental principle of a capacitance type touch detection and to output a touch detection signal Vdet. As described later, the touch detecting device 30 is sequentially scanned to detect a touch on the basis of the drive signal Vcom supplied from the drive electrode scanning unit 16.

The touch detecting unit 40 is a circuit that checks whether a touch with the touch detecting device 30 is present on the basis of the touch detection control signal supplied from the control unit 11 and the touch detection signal Vdet supplied from the touch detecting device 30 of the display device with a touch detecting function 10 and that calculates the coordinates of a touch in the touch detection area. The touch detecting unit 40 includes an LPF (Low-Pass Filter) unit 42, an A/D conversion unit 43, a signal processing unit 44, a coordinate extracting unit 45, and a detection time control unit 46. The LPF unit 42 is a low-pass analog filter that removes a high-frequency component (noise component) included in the touch detection signal Vdet supplied from the touch detecting device 30 and extracts and outputs a touch component. A resistor R giving a DC potential (for example, 0 V) is connected between the input terminals of the LPF unit 42 and the ground. The DC potential (0 V) may be given, for example, by providing a switch instead of the resistor R and turning on the switch at a predetermined time. The A/D conversion unit 43 is a circuit that samples an analog signal output from the LPF unit 42 and converts the sampled analog signal into a digital signal in synchronization with the pulse Pt of the AC drive signal VcomAC. The signal processing unit 44 is a logic circuit that detects a touch with the touch detecting device 30 on the basis of the output signal of the A/D conversion unit 43. The coordinate extracting unit 45 is a logic circuit that calculates the coordinates on the touch panel when a touch is detected by the signal processing unit 44. The detection time control unit 46 controls such circuits to operate in synchronization with each other.

(Display Device with Touch Detecting Function 10)

A configuration example of the display device with a touch detecting function 10 will be described in detail below.

Figure 6:
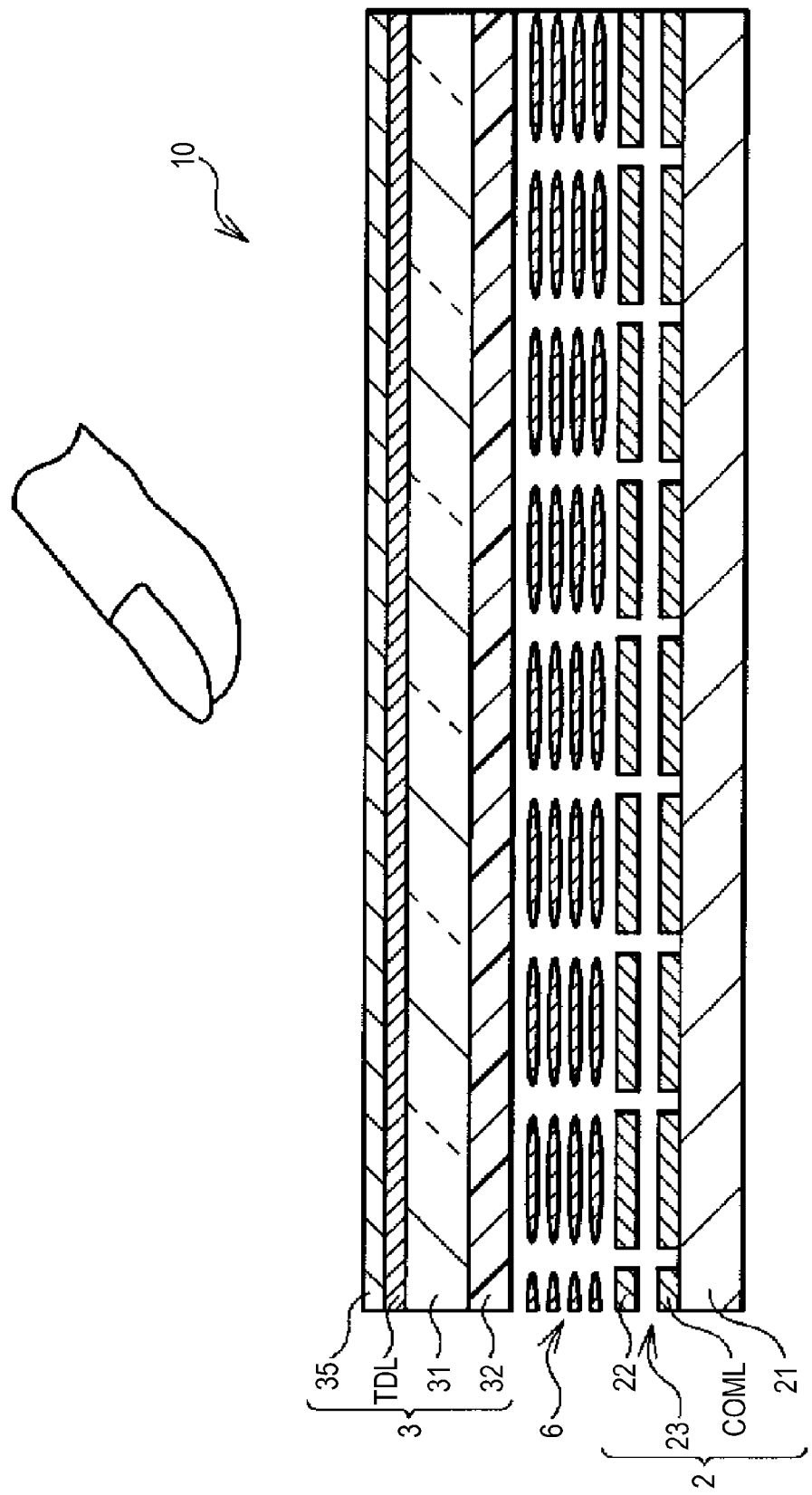
FIG. 6 is a cross-sectional view illustrating a schematic sectional structure of a display device with a touch detecting function shown in FIG. 4.

FIG. 6 shows an example of a cross-sectional structure of a part of the display device with a touch detecting function 10. The display device with a touch detecting function 10 includes a pixel substrate 2, a counter substrate 3 disposed to face the pixel substrate 2, and a liquid crystal layer 6 interposed between the pixel substrate 2 and the counter substrate 3.

The pixel substrate 2 includes a TFT substrate 21 as a circuit board, drive electrodes COML, and pixel electrodes 22. The TFT substrate 21 serves as a circuit board in which various electrodes or interconnections (such as pixel signal lines SGL or scanning signal lines GCL to be described later), thin film transistors (TFT), and the like are formed. The TFT substrate 21 is formed of, for example, glass. The drive electrodes COML are formed on the TFT substrate 21. The drive electrodes COML are electrodes used to supply a common voltage to plural pixels Pix (to be described later). The drive electrodes COML serve as a common drive electrode for a liquid crystal display operation and also serve as a drive electrode for a touch detecting operation. An insulating layer 23 is formed on the drive electrodes COML and the pixel electrodes 22 are formed thereon. The pixel electrodes 22 are electrodes used to supply a pixel signal for a display and have transparency. The drive electrodes COML and the pixel electrodes 22 are formed of, for example, ITO (Indium Tin Oxide).

The counter substrate 3 includes a glass substrate 31, a color filter 32, and a touch detecting electrode TDL. The color filter 32 is formed on one surface of the glass substrate 31. In the color filter 32, three-color color filter layers of red (R), green (G), and blue (B) are periodically arranged and three colors of R, G, and B as a set correspond to each display pixel. The touch detecting electrode TDL is formed on the other surface of the glass substrate 31. The touch detecting electrode TDL is an electrode that is formed of, for example, ITO and that has transparency. A polarizing film 35 is formed on the touch detecting electrode TDL.

The liquid crystal layer 6 serves as a display functional layer and serves to modulate light passing through the liquid crystal layer depending on an electric field state. This electric field is formed by a potential difference between the voltage of the drive electrodes COML and the voltage of the pixel electrodes 22. A liquid crystal of a transverse electric field mode such as an FFS (Fringe Field Switching) or an IPS (In-Plane Switching) is used for the liquid crystal layer 6.

An alignment film is disposed between the liquid crystal layer 6 and the pixel substrate 2 and between the liquid crystal layer 6 and the counter substrate 3 and an incidence-side polarizing film is disposed on the bottom surface of the pixel substrate 2, which are not shown therein.

Figure 7:
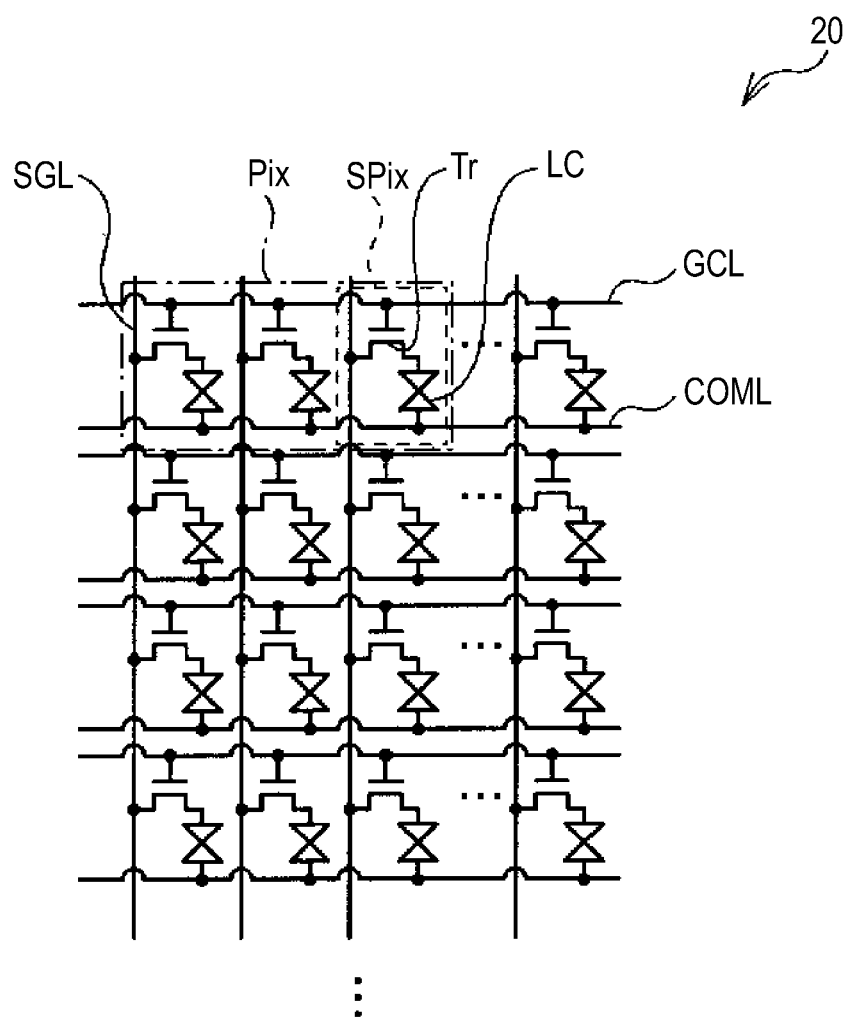
FIG. 7 is a circuit diagram illustrating a pixel arrangement in a liquid crystal display device shown in FIG. 4.

FIG. 7 shows a configuration example of a pixel structure in the liquid crystal display device 20. The liquid crystal display device 20 includes plural pixels Pix which are arranged in a matrix. Each pixel Pix includes three sub pixels SPix. The three sub pixels SPix are arranged to correspond to three colors (R, G, and B) of the color filters 32 shown in FIG. 6. Each sub pixel SPix includes a TFT element Tr and a liquid crystal element LC. The TFT element Tr is formed of a thin film transistor and is formed of an N-channel MOS (Metal Oxide Semiconductor) TFT in this example. The source of the TFT element Tr is connected to the pixel signal line SGL, the gate thereof is connected to the scanning signal line GCL, and the drain thereof is connected to an end of the liquid crystal element LC. An end of the liquid crystal element LC is connected to the drain of the TFT element Tr and the other end thereof is connected to the drive electrode COML.

The sub pixel SPix is connected to the other sub pixels SPix belonging to the same row of the liquid crystal display device 20 via a scanning signal line GCL. The scanning signal line GCL is connected to the gate driver 12 and is supplied with a scanning signal Vscan from the gate driver 12. The sub pixel SPix is connected to the other sub pixels SPix belonging to the same column of the liquid crystal display device 20 via a pixel signal line SGL. The pixel signal line SGL is connected to the selection switch unit 14 and is supplied with a pixel signal Vpix from the selection switch unit 14.

The sub pixel SPix is connected to the other sub pixels SPix belonging to the same row of the liquid crystal display device 20 via a drive electrode COML. The drive electrode COML is connected to the drive electrode scanning unit 16 and is supplied with a drive signal Vcom from the drive electrode scanning unit 16.

According to this configuration, in the liquid crystal display device 20, one horizontal line is sequentially selected by driving the gate driver 12 to line-sequentially scan the scanning signal lines GCL in a time-divisional manner, and a display operation is performed for each horizontal line by causing the source driver 13 and the selection switch unit 14 to supply the pixel signals Vpix to the pixels Pix belonging to the selected horizontal line.

FIG. 8 is a perspective view illustrating a configuration example of the touch detecting device 30. The touch detecting device 30 includes the drive electrodes COML formed on the pixel substrate 2 and the touch detecting electrodes TDL formed on the counter substrate 3. Each drive electrode COML has a striped electrode pattern extending in the horizontal direction of the drawing. When performing a touch detecting operation, as described later, a drive signal Vcom (pulse Pt) is sequentially supplied to the electrode patterns for every block (drive electrode block B to be described later) including a predetermined number of drive electrodes COML to perform a sequential scanning driving operation in a time-divisional manner. Each touch detecting electrode TDL has a striped electrode pattern extending in the direction perpendicular to the extending direction of the electrode patterns of the drive electrodes COML. The electrode patterns of the touch detecting electrode TDL are connected to the inputs of the LPF unit 42 of the touch detecting unit 40. The electrode patterns in which the drive electrodes COML and the touch detecting electrodes TDL intersect each other form capacitors at the intersections.

According to this configuration, in the touch detecting device 30, a touch detection signal Vdet is output from the touch detecting electrodes TDL to detect a touch by causing the drive electrode scanning unit 16 to supply a drive signal Vcom to the drive electrodes COML. That is, the drive electrodes COML correspond to the drive electrode E1 in the fundamental principle of touch detection shown in FIGS. 1A to 3B, the touch detecting electrodes TDL correspond to the touch detecting electrode E2, and the touch detecting device 30 detects a touch on the basis of the fundamental principle. As shown in FIG. 8, the electrode patterns intersecting each other from the capacitance type touch sensor in a matrix shape. Accordingly, by scanning the overall touch detection plane of the touch detecting device 30, it is also possible to detect a position of an approach or a contact of an external adjacent object.

The drive electrode scanning unit 16 drives the drive electrodes COML for each block (drive electrode block B) including a predetermined number of drive electrodes COML to perform a touch detection scanning operation.

FIGS. 9A to 9C schematically illustrate a touch detection scanning operation. In FIGS. 9A to 9C, an operation of supplying a drive signal Vcom to the drive electrode blocks B1 to B20 is shown when the touch detection plane includes 20 drive electrode blocks B1 to B20. In FIGS. 9A to 9C, the hatched drive electrode block B indicates that the pulse Pt of the AC drive signal VcomAC is supplied thereto and the other drive electrode blocks B indicate that the DC drive signal VcomDC is supplied thereto. In this example, the number of drive electrode blocks B is 20 for the purpose of convenience of explanation, but is not limited to this number.

The drive electrode scanning unit 16 supplies the drive signal Vcom to the drive electrodes COML for each drive electrode block B. Each drive electrode block B is set to a width (for example, about 5 mm) corresponding to the size of a user's finger. The drive electrode scanning unit 16 sequentially selects the drive electrode blocks B as a target of the touch detecting operation and supplies the pulse Pt to the drive electrodes COML belonging to the selected drive electrode block B, whereby all the drive electrode blocks B are scanned, as shown in FIGS. 9A to 9C.

FIG. 10 schematically illustrates a display scanning operation and a touch detection scanning operation. In the display panel 1, the gate driver 12 performs a display scanning Scand by line-sequentially scanning the scanning signal lines GCL in a time-divisional manner, and the drive electrode scanning unit 16 performs a touch detection scanning Scant by sequentially selecting and driving the drive electrode blocks B. In this example, the touch detection scanning Scant is performed at double the scanning speed of the display scanning Scand. In this way, in the display panel 1, since the scanning speed of the touch detection scanning is set to be higher than that of the display scanning, it is possible to rapidly respond to a touch of an external adjacent object and thus to improve the response characteristic to a touch detection. The scanning speed is not limited to this example, but the touch detection scanning Scant may be performed at a scanning speed which is two or more times the scanning speed of the display scanning Scand or may be performed at a scanning speed which is two or less times the scanning speed of the display scanning Scand.

(Drive Electrode Scanning Unit 16)

Figure 11:
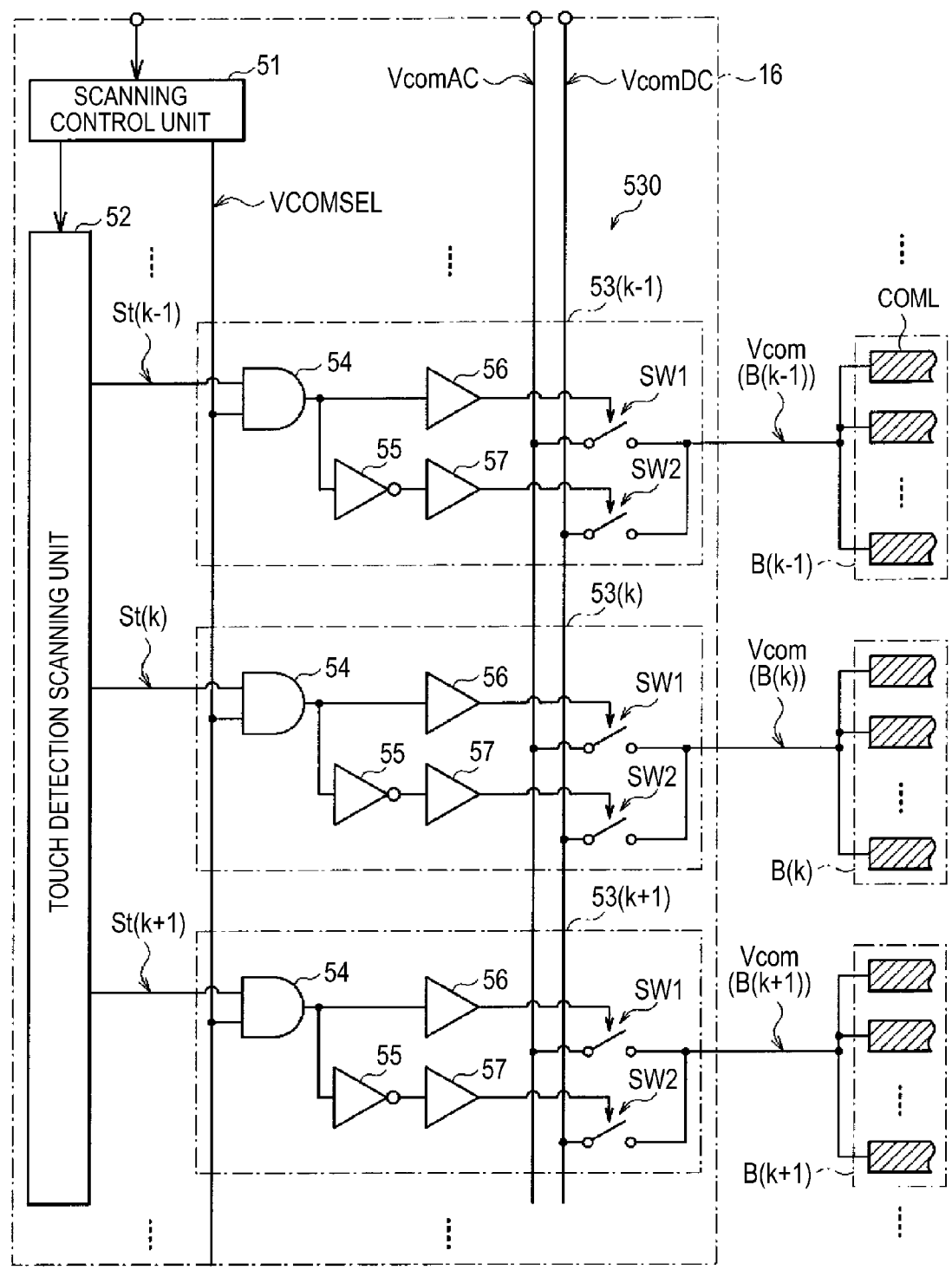
FIG. 11 is a block diagram illustrating a configuration example of a drive electrode scanning unit shown in FIG. 4.

FIG. 11 shows a configuration example of the drive electrode scanning unit 16. The drive electrode scanning unit 16 includes a scanning control unit 51, a touch detection scanning unit 52, and a driver unit 530. The driver unit 530 includes 20 driver units 53(1) to 53(20). Hereinafter, when it is intended to mention any one of 20 driver units 53(1) to 53(20), the driver unit 53 is simply described.

The scanning control unit 51 supplies a control signal to the touch detection scanning unit 52 on the basis of the control signal supplied from the control unit 11. The scanning control unit 51 also has a function of supplying a Vcom selection signal VCOMSEL, which indicates which of the DC drive signal VcomDC and the AC drive signal VcomAC to supply to the drive electrodes COML, to the driver unit 530.

The touch detection scanning unit 52 includes a shift register and generates a scanning signal St for selecting the drive electrode block B to which the pulse Pt of the AC drive signal VcomAC should be applied. Specifically, the touch detection scanning unit 52 generates plural scanning signals St corresponding to the drive electrode blocks B on the basis of the control signal supplied from the scanning control unit 51 as described later. When the touch detection scanning unit 52 supplies, for example, a high-level signal as a k-th scanning signal St(k) to the k-th driver unit 53(k), the driver unit 53(k) supplies the pulse Pt of the AC drive signal VcomAC to the plural drive electrodes COML belonging to the k-th drive electrode block B(k).

The driver unit 530 selects one of the DC drive signal VcomDC and the AC drive signal VcomAC supplied from the drive signal generating unit 15 on the basis of the scanning signals St supplied from the touch detection scanning unit 52 and the Vcom selection signal VCOMSEL supplied from the scanning control unit 51 and supplies the selected drive signal as the drive signal Vcom to the drive electrodes COML. The driver unit 53 is provided for each output signal of the touch detection scanning unit 52 and supplies the drive signal Vcom to the corresponding drive electrode block B.

The driver unit 53 includes a logical product circuit 54, an inverter 55, buffers 56 and 57, and switches SW1 and SW2. The logical product circuit 54 generates and outputs a logical product (AND) of the scanning signal St supplied from the touch detection scanning unit 52 and the Vcom selection signal VCOMSEL supplied from the scanning control unit 51. The inverter 55 generates and outputs the inverted logic of the output signal of the logical product circuit 54. The buffer 56 has a function of amplifying a signal supplied from the logical product circuit 54 to an amplitude level which can control the ON and OFF states of the switch SW1. The ON and OFF states of the switch SW1 are controlled on the basis of the signal supplied from the buffer 56, one end thereof is supplied with the AC drive signal VcomAC, and the other end thereof is connected to plural drive electrodes COML belonging to the drive electrode block B. The buffer 57 has a function of amplifying a signal supplied from the inverter 55 to an amplitude level which can control the ON and OFF states of the switch SW2. The On and OFF states of the switch SW2 are controlled on the basis of the signal supplied from the buffer 57, one end thereof is supplied with the DC drive signal VcomDC, and the other end thereof is connected to the other end of the switch SW1.

According to this configuration, the driver unit 53 outputs the AC drive signal VcomAC as the drive signal Vcom when the scanning signal St is at a high level and the Vcom selection signal VCOMSEL is at a high level, and outputs the DC drive signal VcomDC as the drive signal Vcom when the Vcom selection signal VCOMSEL is at a low level. The driver unit 53 outputs the DC drive signal VcomDC as the drive signal Vcom when the scanning signal St is at a low level. The driver unit 53 supplies the drive signal Vcom output in this way to the plural drive electrodes COML belonging to the drive electrode block B corresponding to the driver unit 53.

(Auxiliary Driver Unit 18)

The arrangement of the blocks in the display panel 1 will be first described before describing the auxiliary driver unit 18.

Figure 12:
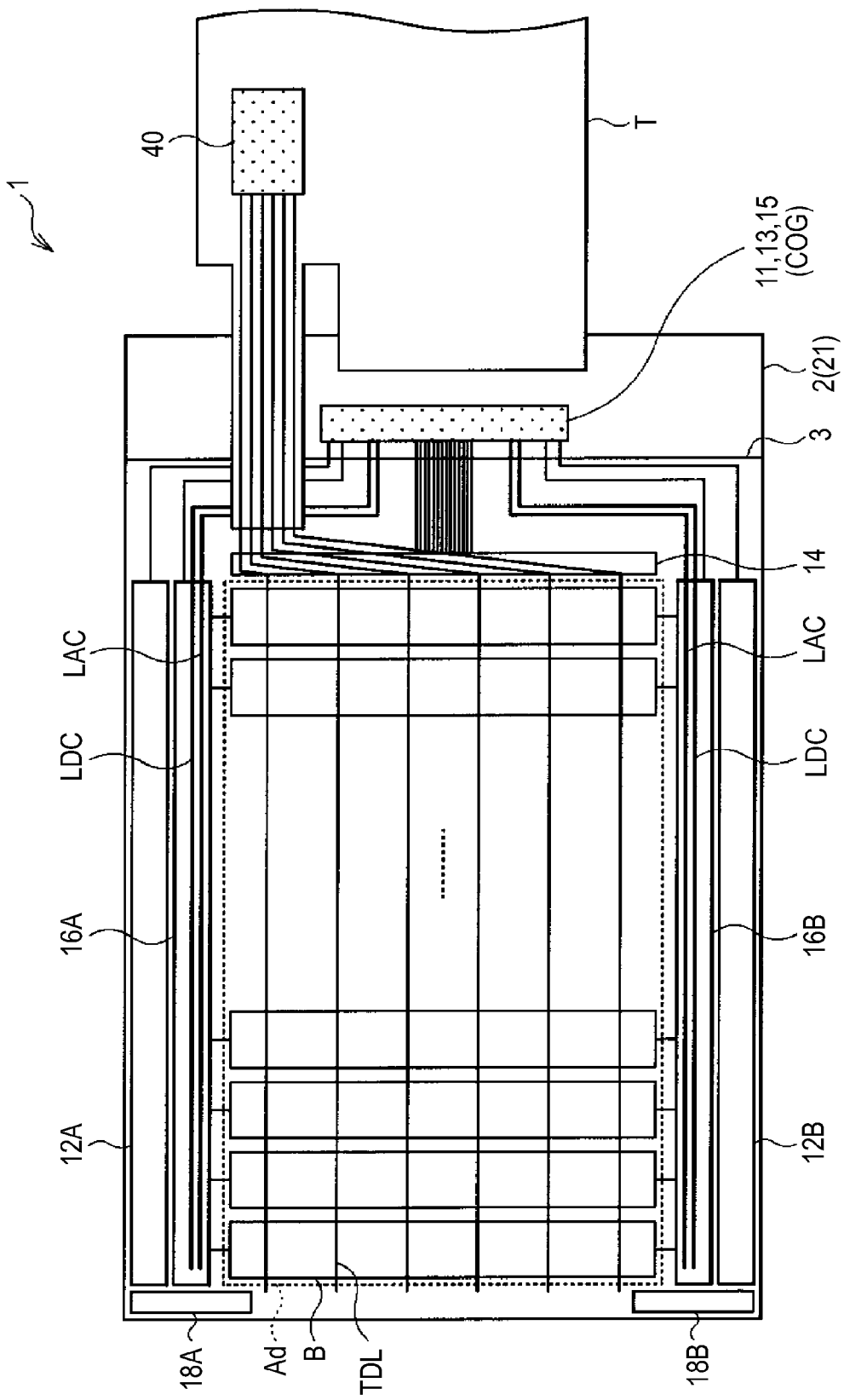
FIG. 12 is a schematic diagram illustrating a mounting example of the display panel shown in FIG. 4.

FIG. 12 schematically illustrates a mounting example of the display panel 1. The control unit 11, the source driver 13, and the drive signal generating unit 15 are mounted as a COG (Chip On Glass) on the pixel substrate 2. The selection switch unit 14 is formed of TFT elements in the vicinity of the display area Ad on the TFT substrate 21.

The gate driver 12 (12A and 12B) is formed of TFT elements on the TFT substrate 21. In this example, the gate driver 12 is disposed on each of the upper side (12A) and the lower side (12B) of the pixel substrate 2 in FIG. 12 and can drive the pixels Pix (not shown) arranged in a matrix in the display area Ad from both sides.

The drive electrode scanning unit 16 (16A and 16B) is formed of TFT elements on the TFT substrate 21. In this example, the drive electrode scanning unit 16 is disposed on each of the upper side (16A) and the lower side (16B) of the pixel substrate 2 in FIG. 12, is supplied with the DC drive signal VcomDC via a line LDC from the drive signal generating unit 15, and is supplied with the AC drive signal VcomAC via a line LAC. The drive electrode scanning units 16A and 16B can drive the plural drive electrode blocks B arranged in parallel from both sides.

The auxiliary driver unit 18 (18A and 18B) is formed of TFT elements on the TFT substrate 21. The auxiliary driver unit 18 is disposed in the vicinity of an end of the line LAC extending from the drive signal generating unit 15. Specifically, in this example, the auxiliary driver unit 18A is disposed in the vicinity of the end of the line LAC for supplying the AC drive signal VcomAC to the drive electrode scanning unit 16A and the auxiliary driver unit 18B is disposed in the vicinity of the end of the line LAC for supplying the AC drive signal VcomAC to the drive electrode scanning unit 16B.

The touch detecting unit 40 is mounted on a flexible printed circuit board T and is connected to the plural touch detecting electrodes TDL arranged in parallel.

As shown in FIG. 12, in the display panel 1, the auxiliary driver unit 18 (18A and 18B) is disposed at a position separated from the drive signal generating unit 15. Accordingly, the auxiliary driver unit 18 serves to reduce the transition time (the rising time tr and the falling time tf) of the pulse Pt supplied to the block B of the drive electrodes COML. That is, since the line LAC includes parasitic resistance or the like and the drive electrodes COML belonging to the drive electrode block B supplied with the pulse Pt via the line LAC have parasitic capacitance or the like, the transition time of the pulse Pt may be elongated in the drive electrode block B located at a position separated from the drive signal generating unit 15. Particularly, this tendency is marked in the drive electrode block B disposed at the end of the line LAC and thus the waveform may be broken. In the display panel 1, by providing the auxiliary driver unit 18 to the vicinity of the end of the line LAC, it is possible to reduce the transition time of the pulse Pt.

Figure 13:
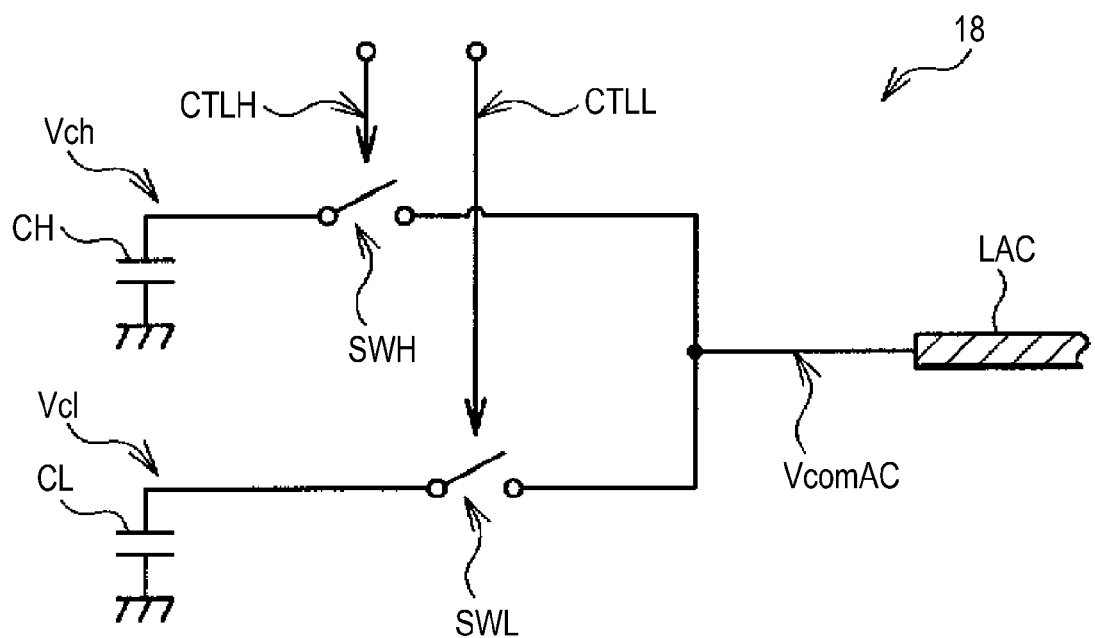
FIG. 13 is a circuit diagram illustrating a configuration example of an auxiliary driver unit shown in FIG. 4.

FIG. 13 shows a configuration example of the auxiliary driver unit 18. The auxiliary driver unit 18 includes capacitive elements CH and CL and switches SWH and SWL. One end of the capacitive element CH is connected to one end of the switch SWH and the other end thereof is grounded. The ON and OFF states of the switch SWH are controlled on the basis of the control signal CTLH supplied from the control unit 11, one end thereof is connected to one end of the capacitive element CH, and the other end thereof is connected to the line LAC. One end of the capacitive element CL is connected to one end of the switch SWL and the other end thereof is grounded. The ON and OFF states of the switch SWL are controlled on the basis of the control signal CTLL supplied from the control unit 11, one end thereof is connected to one end of the capacitive element CL, and the other end thereof is connected to the other end of the switch SWL and the line LAC.

According to this configuration, in the auxiliary driver unit 18, since the switch SWH is changed to the ON state on the basis of the control signal CTLH at the rising time of the pulse Pt of the AC drive signal VcomAC, electric charges are exchanged between the capacitive element CH and the drive electrode block B as a target of the touch detecting operation, thereby reducing the rising time tr of the pulse Pt in the corresponding drive electrode block B. Similarly, in the auxiliary driver unit 18, since the switch SWL is changed to the ON state on the basis of the control signal CTLL at the falling time of the pulse Pt of the AC drive signal VcomAC, electric charges are exchanged between the capacitive element CL and the drive electrode block B as a target of the touch detecting operation, thereby reducing the falling time tf of the pulse Pt in the corresponding drive electrode block B.

The auxiliary driver unit 18 has a function of initializing the voltages of the capacitive elements CH and CL before turning on the switches SWH and SWL using the pulse Pi of the AC drive signal VcomAC as described later.

A configuration example of the capacitive elements CH and CL of the auxiliary driver unit 18 will be described below. The capacitive element CH will be described representatively below, but the same is true of the capacitive element CL.

Figure 14:
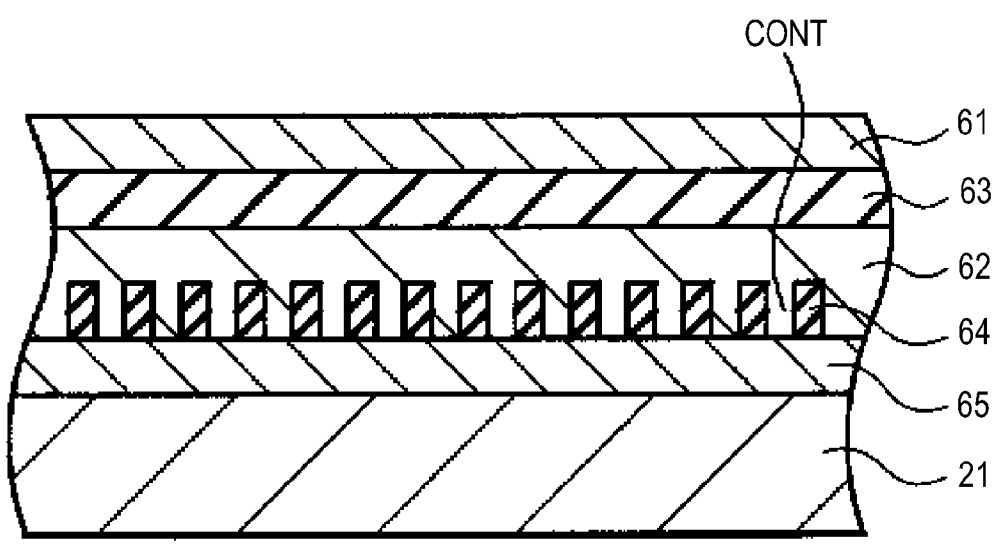
FIG. 14 is a cross-sectional view illustrating a configuration example of a capacitive element shown in FIG. 13.

FIG. 14 shows an example of a partial sectional structure of the capacitive element CH. The capacitive element CH is formed on the pixel substrate 2 shown in FIG. 6. The capacitive element CH includes electrodes 61 and 62 and an insulating layer 63 interposed between the electrodes 61 and 62. The electrode 61 is formed in the same layer as the pixel electrodes 22 (FIG. 6) and is formed of, for example, ITO. The electrode 62 is formed in the same layer as the drive electrodes COML (FIG. 6) and is formed of, for example, ITO. The insulating layer 63 corresponds to the insulating layer 23 (FIG. 6). The electrode 62 is connected to the interconnection layer 65 formed on the TFT substrate 21 via plural contacts CONT. The interconnection layer 65 is formed in the same layer as the pixel signal line SGL (FIG. 7) and is formed of, for example, aluminum. In this example, the electrode 61 (the interconnection layer 65) is connected to one end of the switch SWH and the electrode 62 is grounded. In the capacitive element CL, the electrode 61 (the interconnection layer 65) is connected to one end of the switch SWL and the electrode 62 is grounded.

In this way, the capacitive elements CH and CL can be formed at the same time as forming the display device with a touch detecting function 10 without performing any additional manufacturing process through the manufacturing processes of the display device with a touch detecting function 10 shown in FIG. 6 and the like.

Here, the liquid crystal element LC corresponds to a specific example of the "display element" in the embodiment of the present disclosure. The drive signal generating unit 15 corresponds to a specific example of the "main driver unit" in the embodiment of the present disclosure. The AC drive signal VcomAC corresponds to a specific example of the "basic drive signal" in the embodiment of the present disclosure and the pulse Pt corresponds to a specific example of the "pulse part" in the embodiment of the present disclosure. One of the capacitive element CH and switch SWH and the capacitive element CL and switch SWL corresponds to a specific example of the "first auxiliary driver unit" in the embodiment of the present disclosure and the other end thereof corresponds to a specific example of the "second auxiliary driver unit" in the embodiment of the present disclosure.

[Operations and Advantages]

The operations and advantages of the display panel 1 according to this embodiment will be described below.

(Overall Operations)

The overall operations of the display panel 1 will be described below in brief with reference to FIG. 4. The control unit 11 supplies the control signals to the gate driver 12, the source driver 13, the drive signal generating unit 15, the drive electrode scanning unit 16, the auxiliary driver unit 18, and the touch detecting unit 40 on the basis of the image signal Vdisp, and controls the units to operate in synchronization with each other.

The gate driver 12 supplies the scanning signal Vscan to the liquid crystal display device 20 and sequentially selects one horizontal line as a target of a display driving operation. The source driver 13 generates a pixel signal Vsig into which the pixel signal Vpix is multiplexed and a switch control signal Vsel corresponding thereto and supplies the generated signals to the selection switch unit 14. The selection switch unit 14 separates the pixel signal Vpix on the basis of the pixel signal Vsig and the switch control signal Vsel and supplies the separated pixel signal Vpix to the sub pixels SPix constituting one horizontal line. The drive signal generating unit 15 generates a DC drive signal VcomDC and an AC drive signal VcomAC. The drive electrode scanning unit 16 selects one of the DC drive signal VcomDC and the AC drive signal VcomAC and supplies the selected drive signal as the drive signal Vcom for each drive electrode block B. The auxiliary driver unit 18 assists the driving operation of the drive signal generating unit 15. The display device with a touch detecting function 10 performs the touch detecting operation at the same time as performing the display operation and outputs the touch detection signal Vdet from the touch detecting electrodes TDL.

The touch detecting unit 40 detects a touch on the basis of the touch detection signal Vdet. Specifically, the LPF unit 42 removes a high frequency component (noise component) included in the touch detection signal Vdet and extracts a touch component. The A/D conversion unit 43 converts an analog signal output from the LPF unit 42 into a digital signal. The signal processing unit 44 detects a touch with the display device with a touch detecting function 10 on the basis of the output signal of the A/D conversion unit 43. The coordinate extracting unit 45 calculates the coordinates on the touch panel when a touch is detected by the signal processing unit 44. The detection time control unit 46 controls the LPF unit 42, the A/D conversion unit 43, the signal processing unit 44, and the coordinate extracting unit 45 to operate in synchronization with each other.

(Detailed Operations)

The detailed operations of the display panel 1 will be described below.

Figure 15:
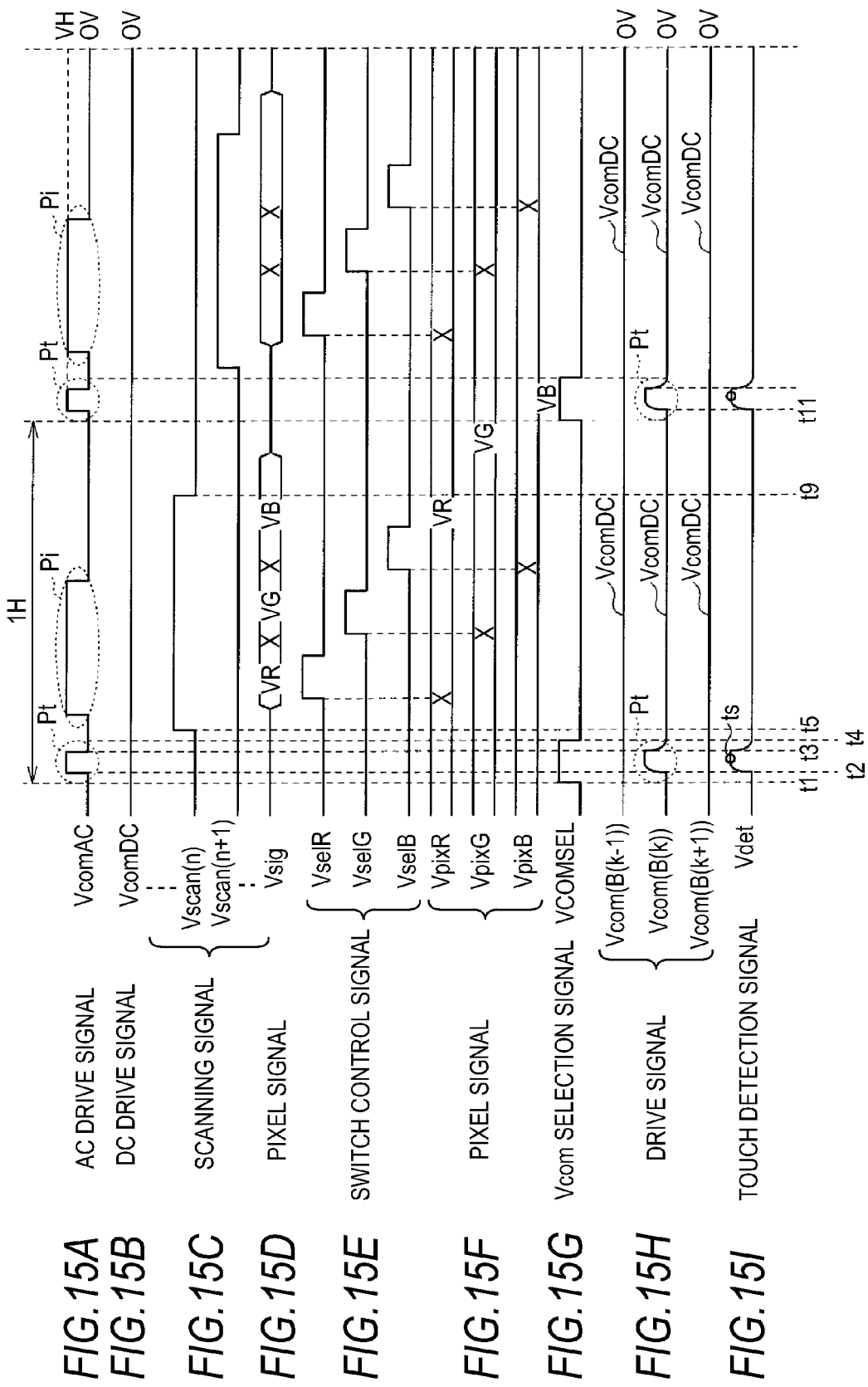
FIGS. 15A to 15I are timing waveform diagrams illustrating an operational example of the display panel shown in FIG. 4.

FIGS. 15A to 15I are diagrams illustrating a timing waveform of the display panel 1, where FIG. 15A represents the waveform of the scanning signal Vscan, FIG. 15B represents the waveform of the pixel signal Vsig, FIG. 15C represents the waveform of the switch control signal Vsel, FIG. 15D represents the waveform of the pixel signal Vpix, FIG. 15E represents the waveform of the Vcom selection signal VCOMSEL, FIG. 15F represents the waveforms of the drive signal Vcom, and FIG. 15G represents the waveform of the touch detection signal Vdet.

In the display panel 1, a touch detecting operation and a display operation are performed in each horizontal period (1H). In the touch detecting operation, the drive electrode scanning unit 16 performs the touch detection scanning by sequentially supplying the pulse Pt of the AC drive signal VcomAC to the drive electrodes COML associated with the touch detecting operation for each drive electrode block B, and the touch detecting unit 40 detects a touch on the basis of the touch detection signal Vdet output from the touch detecting electrodes TDL. In the display operation, the gate driver 12 sequentially supplies the scanning signal Vscan to the scanning signal lines GCL and the source driver 13 and the selection switch unit 14 write the pixel signal Vpix to the sub pixels SPix constituting the selected horizontal line. The details thereof will be described below.

First, at time t1, one horizontal period (1H) is started and the scanning control unit 51 of the drive electrode scanning unit 16 changes the voltage of the Vcom selection signal VCOMSEL from a low level to a high level (FIG. 15G). Accordingly, in the k-th driver unit 53(k) associated with the touch detecting operation in the drive electrode scanning unit 16, the switch SW1 is turned on, the switch SW2 is turned off, the AC drive signal VcomAC (FIG. 15A) generated by the drive signal generating unit 15 is supplied as the drive signal Vcom(B(k)) to the drive electrodes COML belonging to the k-th drive electrode block B(k) via the switch SW1 (FIG. 15H). In the driver units 53 other than the driver unit 53(k), the switch SW1 is turned off, the switch SW2 is turned on, and the DC drive signal VcomDC (FIG. 15B) generated by the drive signal generating unit 15 is supplied to the drive electrodes COML belonging to the corresponding drive electrode block B via the switch SW2 (FIG. 15H).

Then, the drive signal generating unit 15 generates the pulse Pt and outputs the generated pulse as the AC drive signal VcomAC in the period of times t2 to t3 (FIG. 15A). Accordingly, the pulse Pt also appears in the drive signal Vcom(B(k)) supplied to the k-th drive electrode block B(k) (FIG. 15H). The drive signal Vcom(B(k)) is transmitted to the touch detecting electrodes TDL via an electrostatic capacitor and the touch detection signal Vdet is changed (FIG. 15I).

The A/D conversion unit 43 of the touch detecting unit 40 converts the output signal of the LPF unit 42 to which the touch detection signal Vdet (FIG. 15I) is input in an A/D conversion manner at the sampling time ts. The signal processing unit 44 of the touch detecting unit 40 performs the touch detecting operation on the basis of the A/D conversion results collected in plural horizontal periods, as described later.

Then, the scanning control unit 51 of the drive electrode scanning unit 16 changes the voltage of the Vcom selection signal VCOMSEL from a high level to a low level at time t4 (FIG. 15G). Accordingly, in the driver unit 53(k) of the drive electrode scanning unit 16, the switch SW1 is turned off, the switch SW2 is turned on, the DC drive signal VcomDC (FIG. 15B) generated by the drive signal generating unit 15 is supplied as the drive signal Vcom(B(k)) to the drive electrodes COML belonging to the corresponding drive electrode block B(k) via the switch SW2 (FIG. 15H).

Thereafter, the drive signal generating unit 15 generates the pulse Pi and outputs the generated pulse as the AC drive signal VcomAC (FIG. 15A), until the horizontal period (1H) is ended. This pulse Pi is used to initialize the auxiliary driver unit 18 as described below.

The gate driver 12 supplies the scanning signal Vscan to the n-th scanning signal line GCL(n) associated with the display operation at time t5 and thus the scanning signal Vscan(n) is changed from a low level to a high level (FIG. 15C). Accordingly, the gate driver 12 selects one horizontal line as a target of the display operation.

The source driver 13 supplies a pixel voltage VR for the red sub pixels SPix as the pixel signal Vsig to the selection switch unit 14 (FIG. 15D), and generates a switch control signal VselR which is at a high level in the period in which the pixel voltage VR is supplied (FIG. 15E). The selection switch unit 14 separates the pixel voltage VR supplied from the source driver 13 from the pixel signal Vsig by turning on the switch SWR in the period in which the switch control signal VselR is at a high level, and supplies the separated pixel voltage as the pixel signal VpixR to the red sub pixels SPix via the pixel signal line SGL (FIG. 15F). Since the pixel signal line SGL is in a floating state after the switch SWR is turned off, the voltage of the pixel signal line SGL is maintained (FIG. 15F).

Similarly, the source driver 13 supplies a pixel voltage VG for the green sub pixels Spix to the selection switch unit 14 along with the corresponding switch control signal VselG (FIGS. 15D and 15E), and the selection switch unit 14 separates the pixel voltage VG from the pixel signal Vsig on the basis of the switch control signal VselG and supplies the separated pixel voltage as the pixel signal VpixG to the green sub pixels SPix via the pixel signal line SGL (FIG. 15F).

Thereafter, similarly, the source driver 13 supplies a pixel voltage VB for the blue sub pixels Spix to the selection switch unit 14 along with the corresponding switch control signal VselB (FIGS. 15D and 15E), and the selection switch unit 14 separates the pixel voltage VB from the pixel signal Vsig on the basis of the switch control signal VselB and supplies the separated pixel voltage as the pixel signal VpixB to the blue sub pixels SPix via the pixel signal line SGL (FIG. 15F).

The gate driver 12 changes the scanning signal Vscan(n) of the n-th scanning signal line GCL from a high level to a low level at time t9 (FIG. 15C). Accordingly, the sub pixels Spix of one horizontal line associated with the display operation are electrically isolated from the pixel signal line SGL.

At time t11, one horizontal period (1H) is ended and a new horizontal period (1H) is started.

Thereafter, by repeating the above-mentioned operation, the display panel 1 performs the display operation on the overall display plane through the line sequential scanning, and performs the touch detecting operation on the overall touch detection plane by scanning the drive electrodes for each drive electrode block B as described later.

Figure 16:
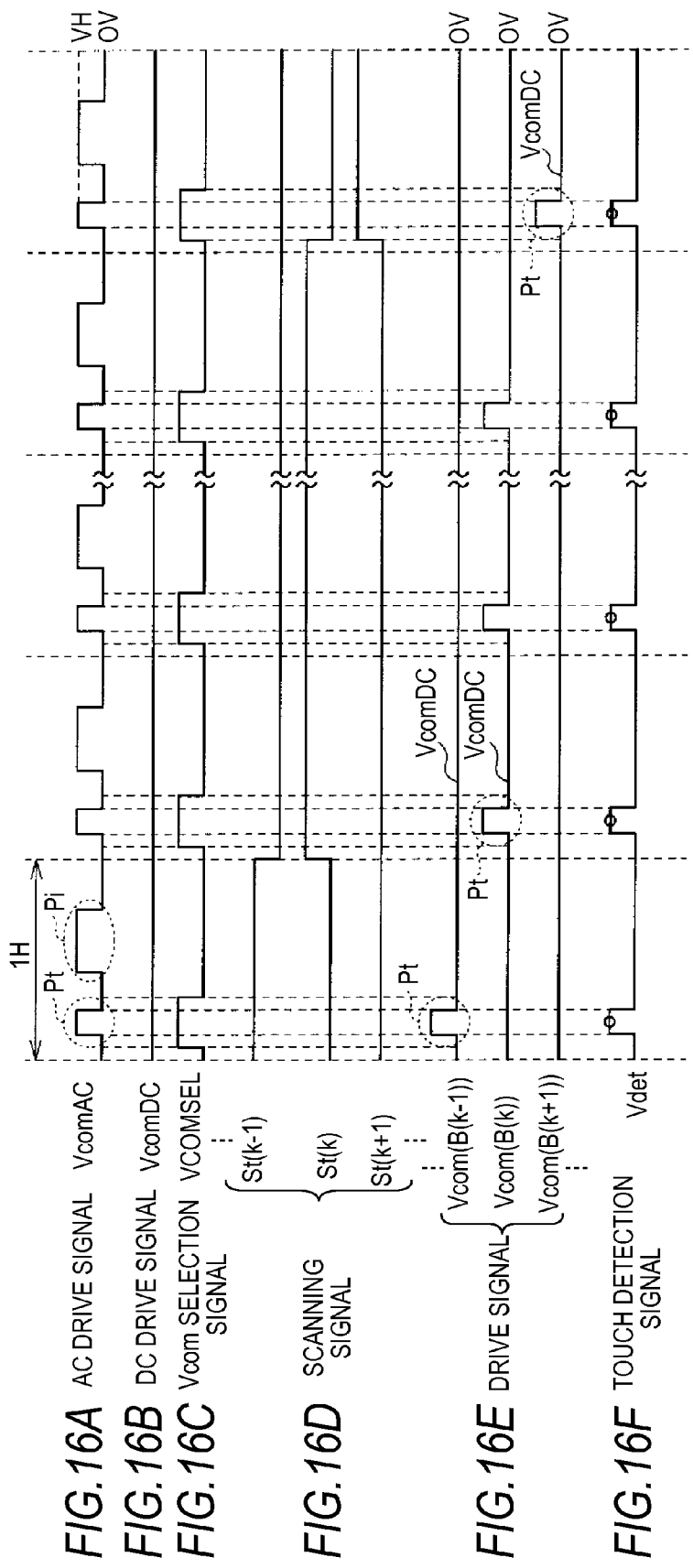
FIGS. 16A to 16F are timing waveform diagrams illustrating an example of a touch detecting operation in the display panel shown in FIG. 4.

FIGS. 16A to 16F show operational examples of a touch detection scanning operation, wherein FIG. 16A represents the waveform of the AC drive signal VcomAC, FIG. 16B represents the waveform of the DC drive signal VcomDC, FIG. 16C represents the waveform of the Vcom selection signal VCOMSEL, FIG. 16D represents the waveform of the scanning signal St, FIG. 16E represents the waveform of the drive signal Vcom, and FIG. 16F represents the waveform of the touch detection signal Vdet. In the drawing, the transition time of the drive signal Vcom or the like is shown to be sufficiently small for the purpose of convenience of explanation.

As shown in FIGS. 16A to 16F, the drive electrode scanning unit 16 performs the touch detection scanning operation by supplying the pulse Pt of the AC drive signal VcomAC (FIG. 16A) to the corresponding drive electrode block B (FIG. 16E) on the basis of the scanning signal St (FIG. 16D) generated by the touch detection scanning unit 52. At this time, the drive electrode scanning unit 16 supplies the pulse Pt to the respective drive electrode blocks B over a predetermined number of horizontal periods. The touch detecting unit 40 samples the touch detection signal Vdet based on the pulse Pt in each horizontal period, and the signal processing unit 44 detects a touch to the area corresponding to the drive electrode block B on the basis of the plural sampling results after the sampling, in the final horizontal period of the predetermined number of horizontal periods, is ended. In this way, since a touch is detected on the basis of the plural sampling results, it is possible to statically analyze the sampling results, thereby suppressing the degradation of the S/N ratio due to the difference between the sampling results and enhancing the touch detection accuracy.

(Detailed Operation of Auxiliary Driver Unit 18)

The operation of the auxiliary driver unit 18 will be described in detail below.

Figure 17:
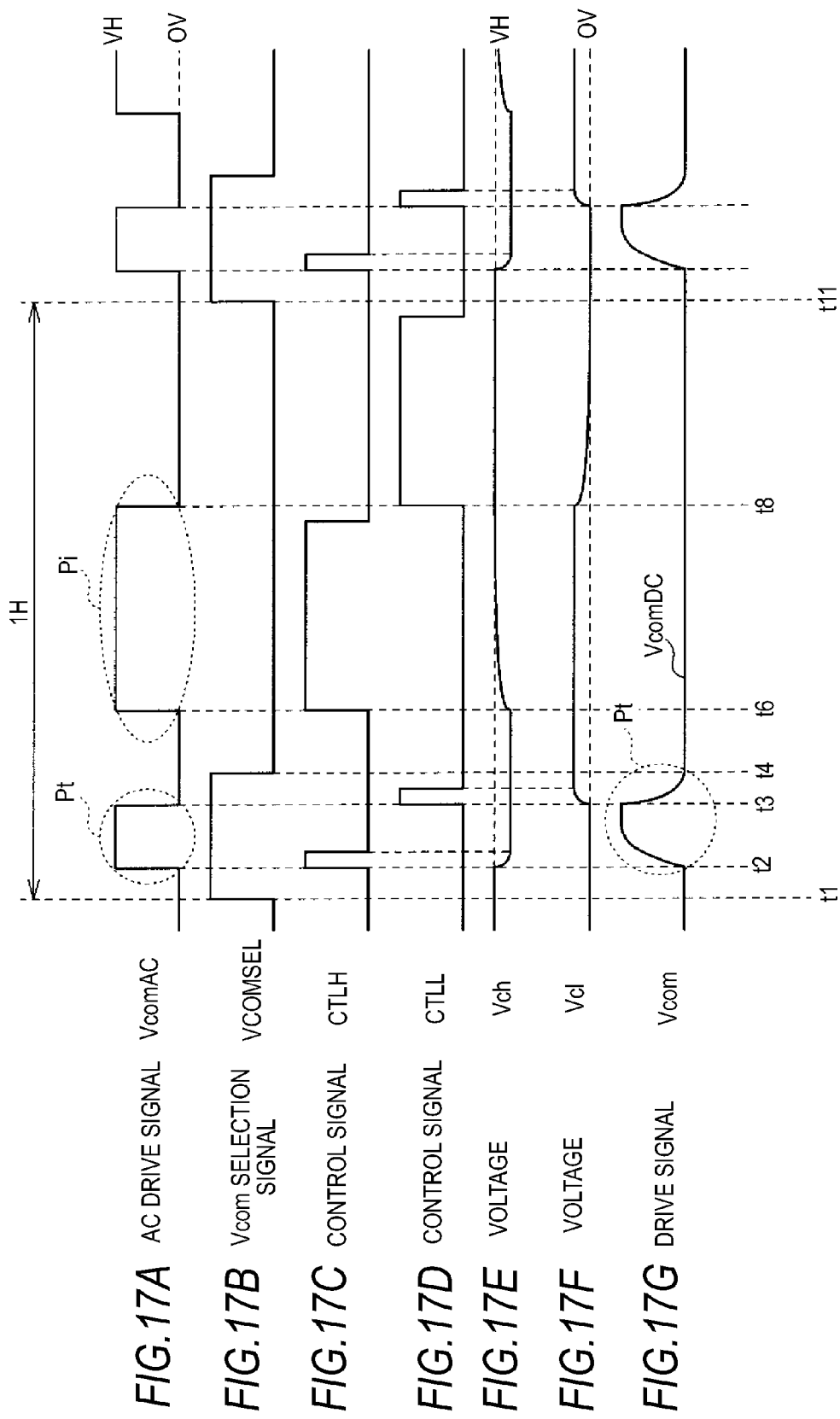
FIGS. 17A to 17G are timing waveform diagrams illustrating an operational example of an auxiliary driver unit shown in FIG. 13.

FIGS. 17A to 17G show timing waveform examples of the touch detecting operation in the display panel 1, where FIG. 17A represents the waveform of the AC drive signal VcomAC in the output of the drive signal generating unit 15, FIG. 17B represents the waveform of the Vcom selection signal VCOMSEL, FIG. 17C represents the waveform of the control signal CTLH, FIG. 17D represents eh waveform of the control signal CTLL, FIG. 17E represents the waveform of the voltage Vch of the capacitive element CH, FIG. 17F represents the waveform of the voltage Vcl of the capacitive element CL, and FIG. 17G represents the waveform of the drive signal Vcom supplied to the drive electrode block B as a target of the touch detecting operation. Times t1 to t4 and t11 in FIGS. 17A to 17G correspond to times t1 to t4 and t11 in FIGS. 15A to 15I, respectively.

In the auxiliary driver unit 18, at the rising and falling of the pulse Pt of the AC drive signal VcomAC, electric charges are exchanged between the capacitive elements CH and CL and the drive electrodes COML belonging to the drive electrode block B as a target of the touch detecting operation. The details thereof will be described below.

First, at time t1, the scanning control unit 51 of the drive electrode scanning unit 16 changes the Vcom selection signal VCOMSEL from a low level to a high level (FIG. 17B). Accordingly, in the driver unit 53 associated with the touch detecting operation in the drive electrode scanning unit 16, the switch SW1 is turned on and the line LAC and the drive electrode block B as a target of the touch detecting operation are connected to each other.

Then, the control unit 11 changes the control signal CTLH to a high level in a predetermined period which is started from time t2 at which the pulse Pt (FIG. 17A) rises (FIG. 17C). Accordingly, the switch SWH of the auxiliary driver unit 18 is turned on, the electric charges move from the capacitive element CH to the drive electrode block B via the line LAC, and the voltage of the drive electrode block B (FIG. 17G) rises for a short time. Accordingly, the voltage Vch of the capacitive element CH is lowered and the level thereof is maintained up to time t6 (to be described later) (FIG. 17E).

The control unit 11 changes the control signal CTLL to a high level in a predetermined period which is started from time t3 at which the pulse Pt (FIG. 17A) falls (FIG. 17D). Accordingly, the switch SWL of the auxiliary driver unit 18 is turned on, electric charges move from the drive electrode block B to the capacitive element CL via the line LAC, and the voltage of the drive electrode block B (FIG. 17G) falls for a short time. Accordingly, the voltage Vcl of the capacitive element CL rises and maintains the level up to time t8 (to be described later) (FIG. 17F).

At time t4, the scanning control unit 51 of the drive electrode scanning unit 16 changes the Vcom selection signal VCOMSEL from a high level to a low level (FIG. 17B). Accordingly, in the driver unit 53 associated with the touch detecting operation in the drive electrode scanning unit 16, the switch SW1 is turned off and the line LAC and the drive electrode block B are electrically isolated from each other.

Thereafter, in the period of times t6 to t11, the voltages of the capacitive elements VH and VL are initialized using the pulse Pi of the AC drive signal VcomAC. Specifically, in the period of times t6 to t8, the drive signal generating unit 15 changes the AC drive signal VcomAC to a high level (voltage VH) (FIG. 17A). At the same time, the control unit 11 changes the control signal CTLH to a high level in a predetermined period started from time t6 and shorter than the pulse width of the pulse Pi (FIG. 17C). Accordingly, the switch SWH of the auxiliary driver unit 18 is turned on, the capacitive element CH is charged via the line LAC by the drive signal generating unit 15, and the voltage Vch of the capacitive element CH varies to the voltage VH. Thereafter, in a predetermined period started from time t8 in which the AC drive signal VcomAC is at a low level (0 V), the control unit 11 changes the control signal CTLL to a high level (FIG. 17D). Accordingly, the switch SWL of the auxiliary driver unit 18 is turned on, the capacitive element CL is discharged via the line LAC, and the voltage Vcl of the capacitive element CL varies to 0 V.

In this way, in the display panel 1, since electric charges are exchanged between the capacitive element CH of the auxiliary driver unit 18 and the drive electrodes COML belonging to the drive electrode block B as a target of the touch detecting operation at the rising of the pulse Pt of the AC drive signal VcomAC, it is possible to shorten the rising time tr of the voltage (the drive signal Vcom) of the drive electrodes COML. Similarly, since electric charges are exchanged between the capacitive element CL of the auxiliary driver unit 18 and the drive electrodes COML at the falling of the pulse Pt, it is possible to shorten the falling time tf of the voltage (the drive signal Vcom) of the drive electrodes COML. Accordingly, for example, even when the drive signal Vcom is supplied to the drive electrode block B separated from the drive signal generating unit 15 and located in the vicinity of the end of the line LAC, it is possible to shorten the transition time (the rising time tr and the falling time tf) of the drive signal Vcom.

In this way, by shortening the transition time of the drive signal Vcom (pulse Pt), it is possible to reduce the possibility of lowering the touch detection accuracy in the display panel 1. That is, for example, when the auxiliary driver unit 18 is not provided, the transition time of the drive signal Vcom may increase and thus the pulse waveform may collapse. In this case, since the collapsed pulse signal is transmitted to the touch detecting electrodes TDL and is output as the touch detection signal Vdet, there is a possibility of lowering the touch detection accuracy. On the contrary, in the display panel 1, since the transition time of the drive signal Vcom (pulse Pt) can be shortened, it is possible to reduce the possibility of collapsing of the waveform of the drive signal Vcom and thus to reduce the possibility of lowering the touch detection accuracy.

By shortening the transition time of the drive signal Vcom, it is possible to cope with an increase in precision or an increase in size of the display panel 1 and the like. Specifically, for example, when a high-precision liquid crystal display device 20 is used, the ratio of the writing time of a pixel signal in a period of one frame increases with an increase in the number of horizontal lines and thus it is difficult to guarantee the time for the touch detecting operation. In the display panel 1, since the transition time of the drive signal Vcom can be shortened as described above, it is possible to shorten the time for the touch detecting operation and to cope with an increase in precision or an increase in size of the display panel 1.

The capacitance values of the capacitive elements CH and CL of the auxiliary driver unit 18 will be described below.

Figure 18:
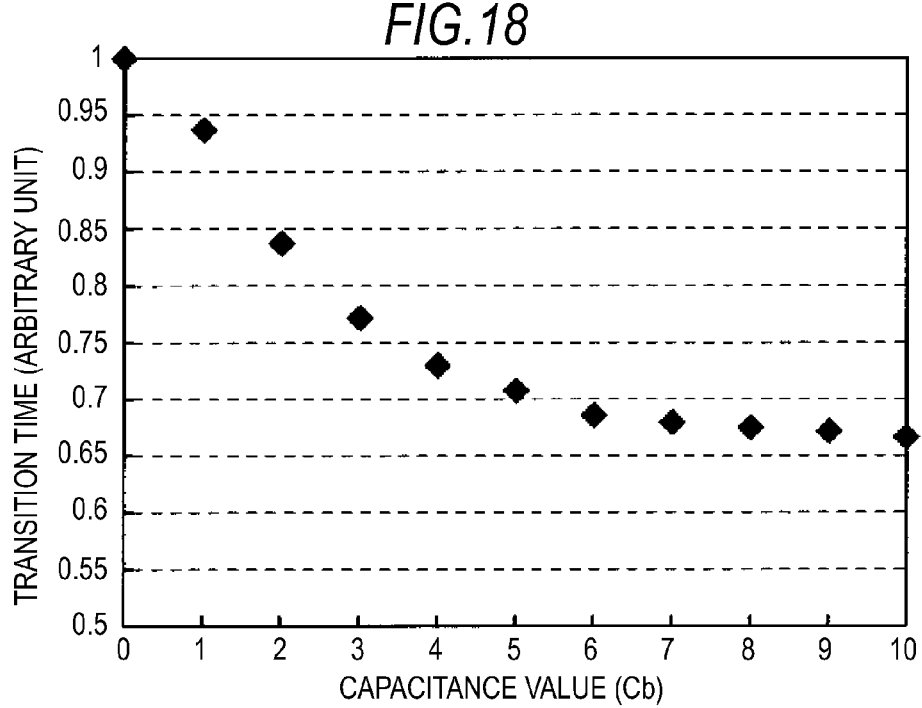
FIG. 18 is a characteristic diagram illustrating a characteristic example of the auxiliary driver unit shown in FIG. 13.

FIG. 18 shows the relationship between the capacitance values of the capacitive elements CH and CL and the transition time (the rising time tr and the falling time tf) of the drive signal Vcom in the drive electrode block B disposed in the vicinity of the end of the line LAC. In FIG. 18, the capacitance values of the capacitive elements CH and CL are expressed with the parasitic capacitance Cb of each drive electrode block B as a unit. That is, since the touch detection scanning is performed in the display panel 1 by supplying the drive signal Vcom to each drive electrode block B, the capacitance values of the capacitive elements CH and CL are expressed with the parasitic capacitance Cb of each drive electrode block B as a unit.

As shown in FIG. 18, with an increase in capacitance values of the capacitive elements CH and CL, the transition time of the drive signal Vcom becomes shortened and the transition time is almost saturated when the capacitance values become about seven to ten times the parasitic capacitance Cb. On the other hand, when the capacitance values of the capacitive elements CH and CL increase, a larger arrangement area is necessary. Accordingly, it is necessary to determine the capacitance values of the capacitive elements CH and CL in consideration of both the arrangement areas of the capacitive elements CH and CL and the transition time. Specifically, in this example, it is preferable that the capacitance values of the capacitive elements CH and CL be set to about three times the parasitic capacitance Cb.

[Advantages]

As described above, in this embodiment, since the auxiliary driver unit is disposed, it is possible to shorten the transition time of the drive signal and thus to drive the respective drive electrode blocks for a shorter time.

In this embodiment, since the transition time of the drive signal is shortened, it is possible to reduce the possibility of collapsing of the waveform of the drive signal and thus to suppress the lowering of the touch detection accuracy.

In this embodiment, since the auxiliary driver unit is disposed at a position separated from the drive signal generating unit, it is possible to shorten the transition time of the drive signal in the drive electrode separated from the drive signal generating unit.

In this embodiment, since the capacitive elements are initialized via the line LAC, it is not necessary to provide a dedicated line for initializing the capacitive elements and it is thus to possible to reduce the space for the line.

In this embodiment, since the capacitive elements are formed through the processes of manufacturing the display device with a touch detecting function, it is not necessary to add a manufacturing process and it is thus possible to simplify the manufacturing processes.

MODIFIED EXAMPLE 1-1

Figure 19A:
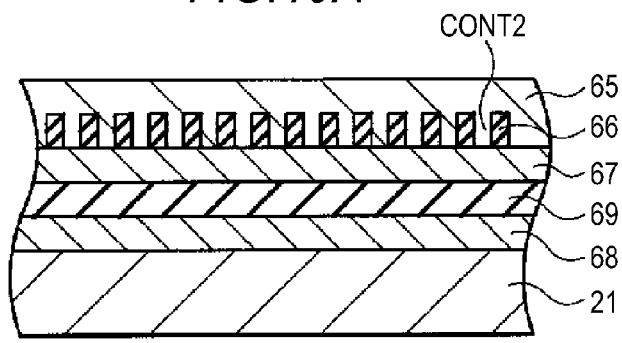
FIGS. 19A and 19B are cross-sectional views illustrating a configuration example of a capacitive element according to a modified example of the first embodiment.
Figure 19B:
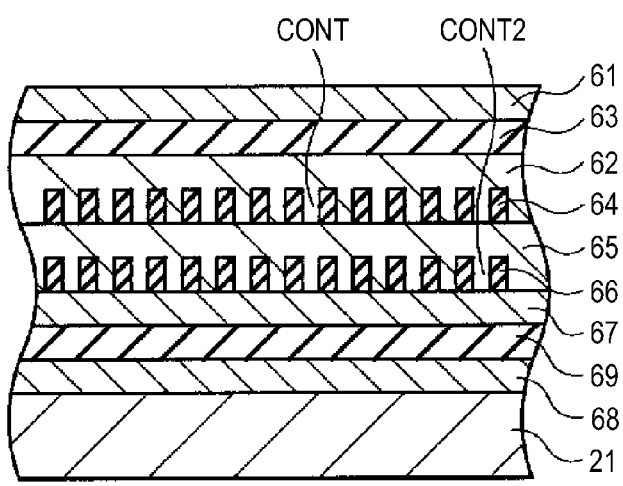

In the above-mentioned embodiment, the electrodes 61 of the capacitive elements CH and CL are formed in the same layer as the pixel electrodes 22 and the electrodes 62 are formed in the same layer as the drive electrodes COML, but the embodiment of the present disclosure is not limited to this configuration. For example, the electrodes may be formed as shown in FIGS. 19A and 19B. The capacitive element CH will be described below as an example.

In the configuration shown in FIG. 19A, the capacitive element CH includes electrodes 67 and 68 and an insulating layer 69 interposed between the electrodes 67 and 68. The electrode 67 is formed in the same layer as the scanning signal line GCL (FIG. 7) and is formed of, for example, aluminum. The electrode 68 is formed on the TFT substrate 21 in the same layer as the gate electrode of the TFT element Tr and is formed of, for example, molybdenum. The electrode 67 is connected to an interconnection layer 65 via plural contacts CONT2. In this example, the electrode 67 (the interconnection layer 65) is connected to one end of the switch SWH and the electrode 68 is grounded. In the case of the capacitive element CL, the electrode 67 (the interconnection layer 65) is connected to one end of the switch SWL and the electrode 68 is grounded.

The configuration shown in FIG. 19B is obtained by combining the configuration (FIG. 14) according to the above-mentioned embodiment and the configuration shown in FIG. 19A. That is, in this configuration, the capacitor constructed by the electrodes 61 and 62 and the insulating layer 63 and the capacitor constructed by the electrodes 67 and 68 and the insulating layer 69 are superimposed. In this example, the electrodes 62 and 67 (the interconnection layer 65) are connected to one end of the switch SWH and the electrodes 61 and 68 are grounded. In the case of the capacitive element CL, the electrodes 62 and 67 (the interconnection layer 65) are connected to one end of the switch SWL and the electrodes 61 and 68 are grounded.

In this way, even when the capacitive elements CH and CL are constructed with any configuration of FIGS. 19A and 19B, it is possible to form the capacitive elements at the same time as forming the display device with a touch detecting function 10 without adding any manufacturing process.

MODIFIED EXAMPLE 1-2

In the above-mentioned embodiment, as shown in FIGS. 17A to 17G, the control unit 11 changes the control signal CTLH from a low level to a high level at time t2 at which the AC drive signal VcomAC is changed from a low level to a high level and changes the control signal CTLL from a low level to a high level at time t3 at which the AC drive signal VcomAC is changed from a high level to a low level, but the embodiment of the present disclosure is not limited to this configuration. Alternatively, for example, as shown in FIGS. 20A to 20G, the control signal CTLH may be changed from a low level to a high level before time t2 and the control signal CTLL may be changed from a low level to a high level before time t3.

<3. Second Embodiment>

A display panel 7 according to a second embodiment of the present disclosure will be described below. In this embodiment, the capacitive elements CH and CL of the auxiliary driver unit are initialized by the use of a dedicated line. Substantially the same elements as in the display panel 1 according to the first embodiment are referenced by the same reference numerals and description thereof will not be repeated.

Figure 21:
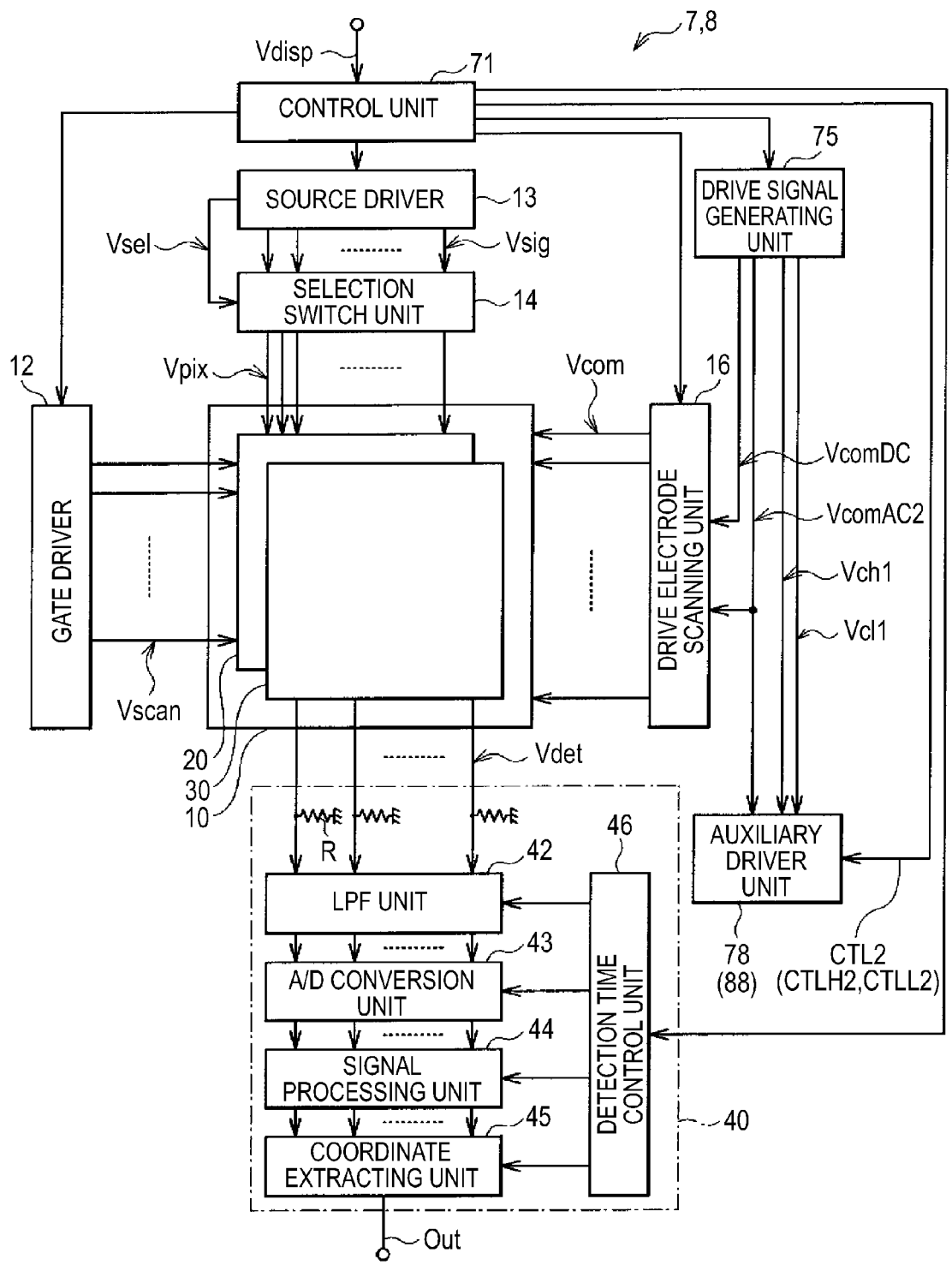
FIG. 21 is a block diagram illustrating a configuration example of a display panel according to second and third embodiments of the present disclosure.

FIG. 21 shows a configuration example of the display panel 7 according to this embodiment. The display panel 7 includes a drive signal generating unit 75, an auxiliary driver unit 78, and a control unit 71.

The drive signal generating unit 75 generates a DC drive signal VcomDC, an AC drive signal VcomAC2, and DC signals Vchl and Vcl1. The AC drive signal VcomAC2 is a signal including a pulse Pt with a low-level voltage of 0 V and a high-level voltage of VH. That is, the AC drive signal VcomAC2 is a signal including a pulse Pi unlike the AC drive signal VcomAC in the above-mentioned embodiment. The voltage of the DC signal Vchl is a voltage VH in this example, and the voltage of the DC signal Vcl1 is 0 V in this example. That is, in this example, the voltage of the DC signal Vchl is the same as the high-level voltage of the AC drive signal VcomAC2 and the voltage of the DC signal Vcl1 is the same as the low-level voltage of the AC drive signal VcomAC2. The drive signal generating unit 75 supplies the DC signal Vchl to the auxiliary driver unit 78 via a dedicated line LH and supplies the DC signal Vcl1 to the auxiliary driver unit 78 via a dedicated line LL.

The auxiliary driver unit 78 assists the driving operation of the drive signal generating unit 75, similarly to the auxiliary driver unit 18 in the first embodiment. At this time, the auxiliary driver unit 78 initializes the capacitive elements CH and CL using the DC signals Vchl and Vcl1 supplied from the drive signal generating unit 75 via the lines LH and LL. The control unit 71 supplies control signals CTL2 (CTLH2 and CTLL2) to the auxiliary driver unit 78.

Figure 22:
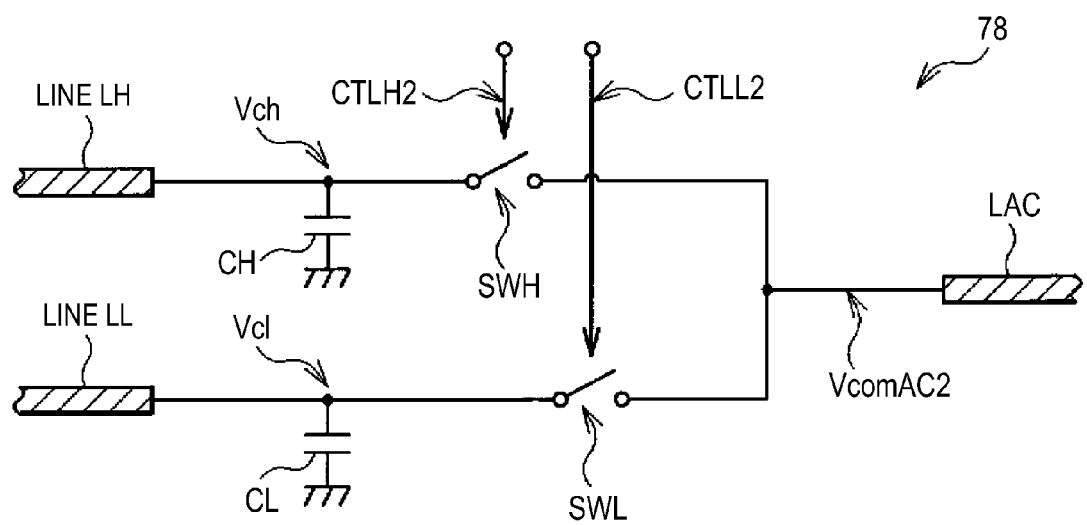
FIG. 22 is a circuit diagram illustrating a configuration example of an auxiliary driver unit according to the second embodiment.

FIG. 22 shows a configuration example of the auxiliary driver unit 78. In the auxiliary driver unit 78, one end of the capacitive element CH is connected to one end of the switch SWH and is also connected to the line LH. Similarly, one end of the capacitive element CL is connected to one end of the switch SWL and is also connected to the line LL.

Figure 23:
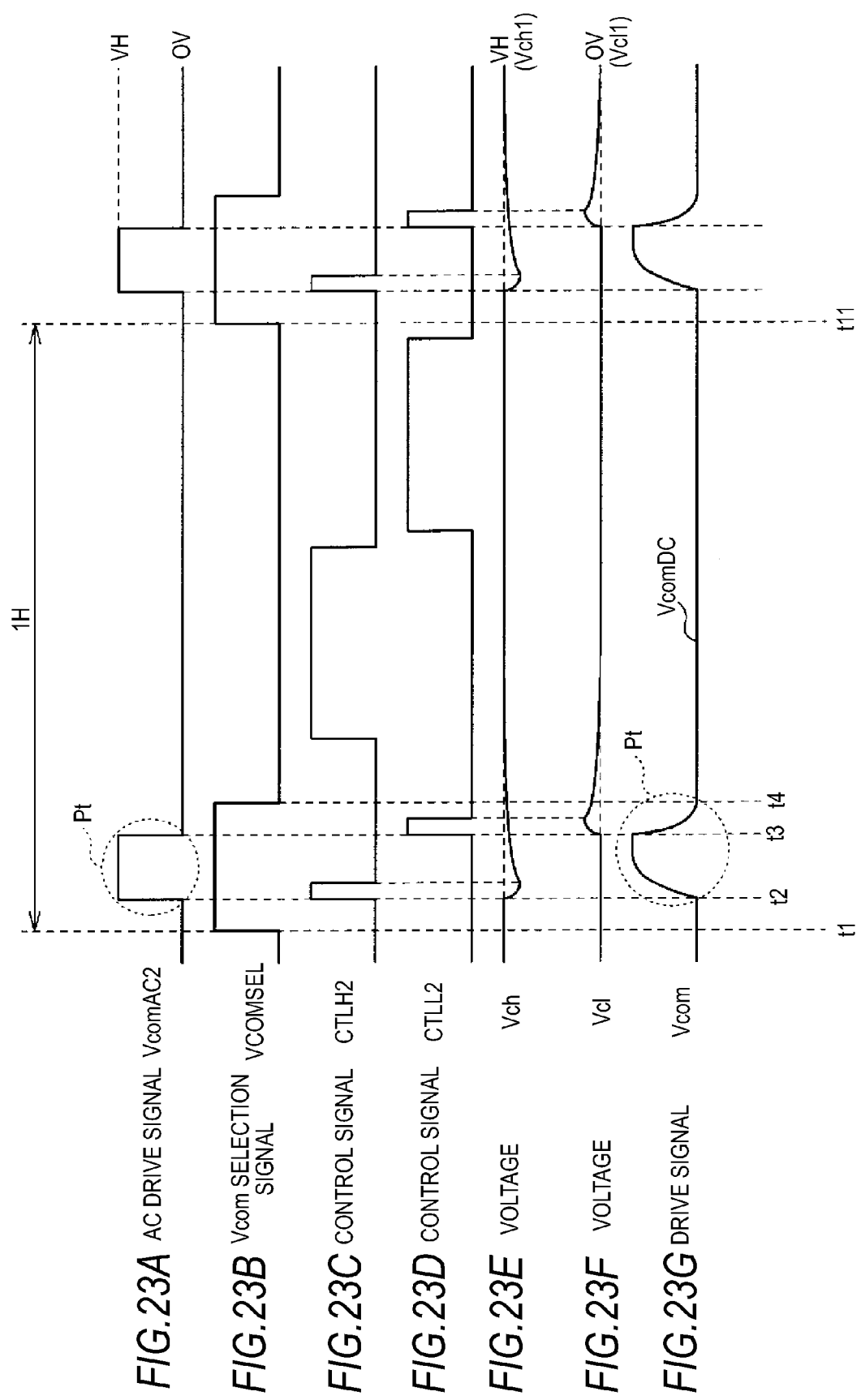
FIGS. 23A to 23G are timing waveform diagrams illustrating an operational example of the auxiliary driver unit shown in FIG. 22.

FIGS. 23A to 23G show timing waveform examples of a touch detecting operation in the display panel 7, where FIG. 23A represents the waveform of the AC drive signal VcomAC2 in the output of the drive signal generating unit 75, FIG. 23B represents the waveform of the Vcom selection signal VCOMSEL, FIG. 23C represents the waveform of the control signal CTLH2, FIG. 23D represents eh waveform of the control signal CTLL2, FIG. 23E represents the waveform of the voltage Vch of the capacitive element CH, FIG. 23F represents the waveform of the voltage Vcl of the capacitive element CL, and FIG. 23G represents the waveform of the drive signal Vcom supplied to the drive electrode block B as a target of the touch detecting operation.

In the auxiliary driver unit 78, the capacitive element CH is normally supplied with the DC signal Vchl (voltage VH) via the line LH and the capacitive element CL is normally supplied with the DC signal Vcl1 (0 V) via the line LL. Accordingly, the voltage Vch of the capacitive element CH is changed to the voltage VH when the control signal CTLH2 is changed from a high level to a low level and the switch SWH is turned off as shown in FIG. 23E, and the voltage Vcl of the capacitive element CL is changed to 0 V when the control signal CTLL2 is changed from a high level to a low level and the switch SWL is turned off as shown in FIG. 23F.

In this way, in the display panel 7, since the capacitive elements CH and CL are initialized by normally supplying the DC signals Vchl and Vcl1 to the capacitive elements CH and CL, it is possible to simplify the circuit operation. That is, in the first embodiment, the drive signal generating unit 15 generates the pulse Pi and the auxiliary driver unit 18 initializes the capacitive elements CH and CL on the basis of the pulse Pi and the control signal CTL supplied from the control unit 11. However, in this embodiment, since the capacitive elements CH and CL are initialized on the basis of the DC signals Vchl and Vcl1 normally supplied, it is possible to simplify the circuit operation for initialization.

In this way, in this embodiment, since the DC signals are normally supplied to the capacitive elements, it is possible to simplify the circuit operation of initializing the capacitive elements. The other advantages are the same as in the first embodiment.

Modified Example 2-1

Modified Examples 1-1 and 1-2 of the first embodiment may be applied to the display panel 7 according to the second embodiment.

Modified Example 2-2

Although it is stated in the above-mentioned embodiment that the voltage of the DC signal Vchl is set to be equal to the high-level voltage (the voltage VH) of the AC drive signal VcomAC2 and the voltage of the DC signal Vcl1 is set to be equal to the low-level voltage (0 V) of the AC drive signal VcomAC2, the embodiment of the present disclosure is not limited to this configuration and such voltages can be arbitrarily set. Specifically, For example, the voltage of the DC signal Vchl may be set to a voltage higher than the voltage VH and the voltage of the DC signal Vcl1 may be set to a voltage lower than 0 V.

<4. Third Embodiment>

A display panel 8 according to a third embodiment will be described below. In this embodiment, in the auxiliary driver unit 78 according to the second embodiment, a switch is disposed between the line LH and the capacitive element CH and a switch is disposed between the line LL and the capacitive element CL similarly. Substantially the same elements as in the display panel 7 according to the second embodiment will be referenced by the same reference numerals and description thereof will not be repeated.

The display panel 8 includes an auxiliary driver unit 88 as shown in FIG. 21. In this example, the voltage of the DC signal Vchl generated by the drive signal generating unit 75 is a voltage VH2 which is higher than the voltage VH and the voltage of the DC signal Vcl1 is a voltage VL2 which is lower than 0 V.

Figure 24:
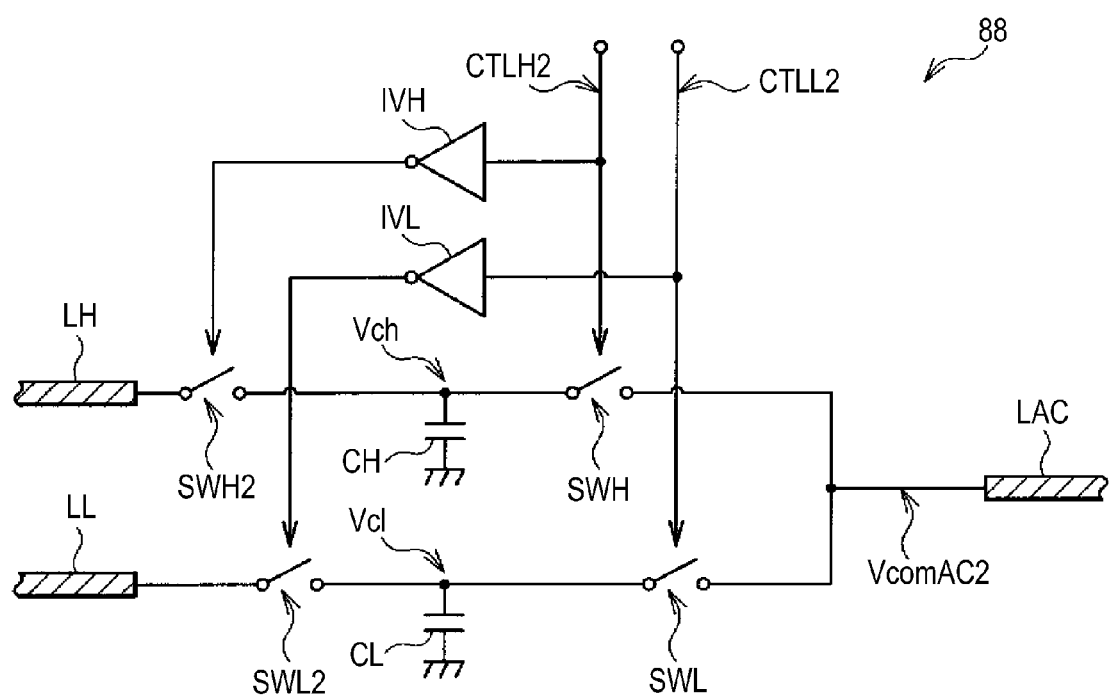
FIG. 24 is a circuit diagram illustrating a configuration example of an auxiliary driver unit according to the third embodiment.

FIG. 24 shows a configuration example of the auxiliary driver unit 88 according to this embodiment. The auxiliary driver unit 88 includes inverters IVH and IVL and switches SWH2 and SWL2. The inverter IVH generates and outputs the inverted logic of a control signal CTLH2. The ON and OFF states of the switch SWH2 are controlled on the basis of the output signal of the inverter IVH, one end thereof is connected to one end of the capacitive element CH, and the other end thereof is connected to the line LH. The inverter IVL generates and outputs the inverted logic of a control signal CTLL2. The ON and OFF states of the switch SWL2 are controlled on the basis of the output signal of the inverter IVL, one end thereof is connected to one end of the capacitive element CL, and the other end thereof is connected to the line LL.

According to this configuration, in the auxiliary driver unit 88, one end of the capacitive element CH is connected to the line LAC when the control signal CTLH2 is at a high level, and is connected to the line LH when the control signal CTLH2 is at a low level. Similarly, one end of the capacitive element CL is connected to the line LAC when the control signal CTLL2 is at a high level, and is connected to the line LL when the control signal CTLL2 is at a low level.

Here, the switches SWH2 and SWL2 correspond to a specific example of the "voltage supply switch" in the embodiment of the present disclosure.

Figure 25:
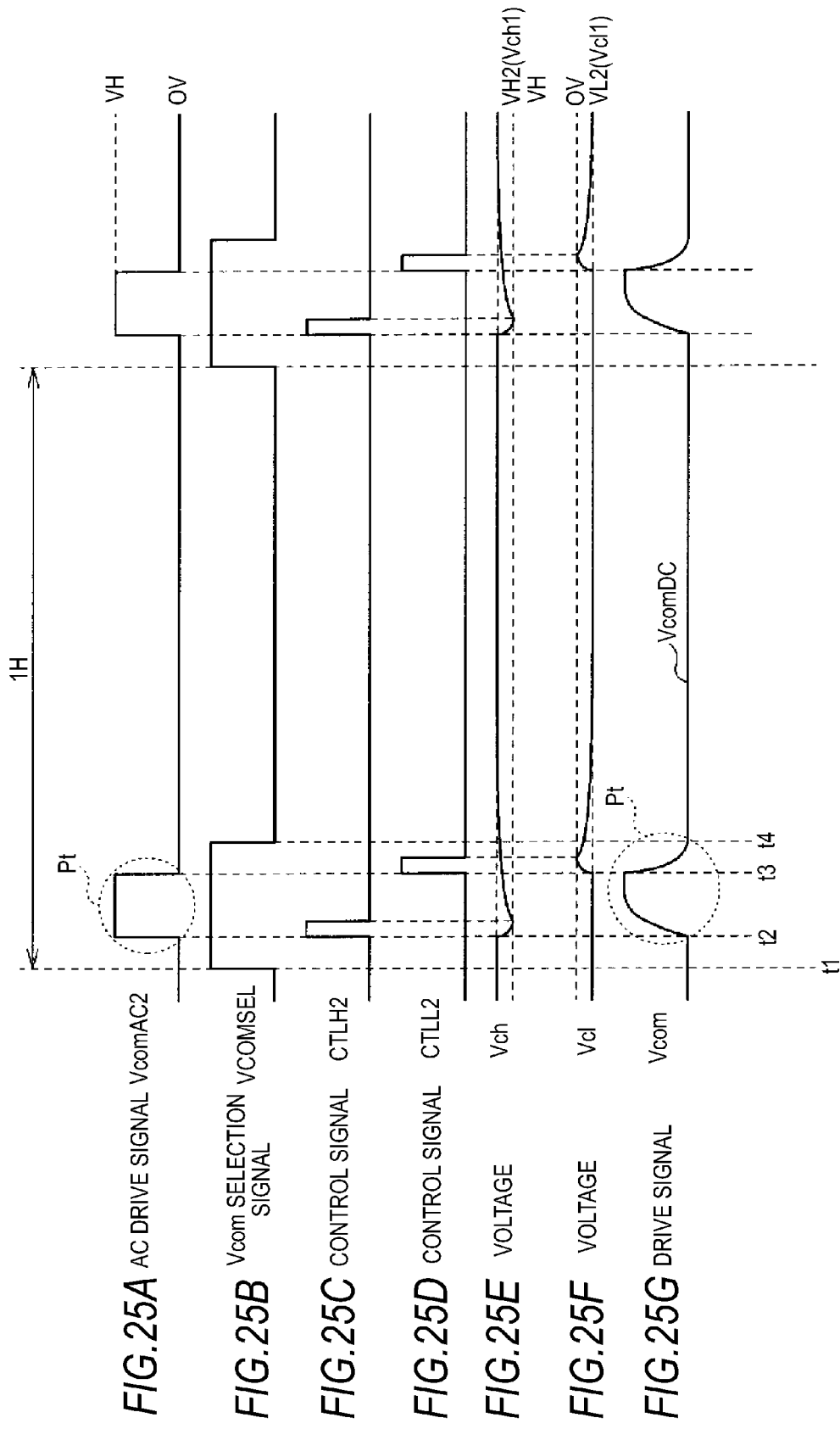
FIGS. 25A to 25G are timing waveform diagrams illustrating an operational example of the auxiliary driver unit shown in FIG. 24.

FIGS. 25A to 25G show timing waveform examples of a touch detecting operation in the display panel 8, where FIG. 25A represents the waveform of the AC drive signal VcomAC2 in the output of the drive signal generating unit 75, FIG. 25B represents the waveform of the Vcom selection signal VCOMSEL, FIG. 25C represents the waveform of the control signal CTLH2, FIG. 25D represents eh waveform of the control signal CTLL2, FIG. 25E represents the waveform of the voltage Vch of the capacitive element CH, FIG. 25F represents the waveform of the voltage Vcl of the capacitive element CL, and FIG. 25G represents the waveform of the drive signal Vcom supplied to the drive electrode block B as a target of the touch detecting operation.

In the auxiliary driver unit 88, in the period in which the control signal CTLH2 is at a low level, the switch SWH2 is turned on and the voltage Vch of the capacitive element CH is initialized to be a voltage VH2 (FIG. 25E). In the period in which the control signal CTLH2 is at a high level, similarly to the second embodiment or the like, the switch SWH is turned on and electric charges are exchanged between the capacitive element CH and the drive electrode block B. Similarly, in the auxiliary driver unit 88, in the period in which the control signal CTLL2 is at a low level, the switch SWL2 is turned on and the voltage Vcl of the capacitive element CL is initialized to be a voltage VL2 (FIG. 25F). In the period in which the control signal CTLL2 is at a high level, the switch SWL is turned on and electric charges are exchanged between the capacitive element CL and the drive electrode block B. That is, when the control signals CTLH2 and CTLL2 are at a high level, the display panel 8 operates so that the voltage (the drive signal Vcom) of the drive electrodes COML is changed for a short time by so-called overdrive.

In the display panel 8, in order to achieve the overdrive effect, the drive signal generating unit 75 generates a voltage VH2 higher than the voltage VH and supplies the generated voltage as the DC signal Vchl to the auxiliary driver unit 88, and generates a voltage VL2 lower than 0 V and supplies the generated voltage as the DC signal Vcl1 to the auxiliary driver unit 88. In the auxiliary driver unit 88, the switches SWH and SWH2 work complementarily and the switches SWL and SWL2 work complementarily. Accordingly, in the display panel 8, since the line LAC and the line LH are not directly connected to each other and the line LAC and the line LL are not directly connected to each other, it is possible to reduce the possibility in which the circuit operation is unstable.

As described above, in this embodiment, since the switch SWH2 working to be complementary to the switch SWH is provided and the switch SWL2 working to be complementary to the switch SWL is provided, it is possible to reduce the possibility in which the circuit operation is unstable. The other advantages are the same as in the second embodiment.

Modified Example 3-1

Although it is described in the above-mentioned embodiment that the voltage of the DC signal Vch1 is set to a voltage VH2 higher than the voltage VH and the voltage of the DC signal Vcl1 is set to a voltage VL2 lower than 0 V, the embodiment of the present disclosure is not limited to this configuration and, for example, the voltage of the DC signal Vch1 may be set to a voltage VH and the voltage of the DC signal Vcl1 may be set to 0 V.

<5. Application Examples>

Application examples of the display panel described in the above-mentioned embodiments and modified examples will be described below.

Figure 26:
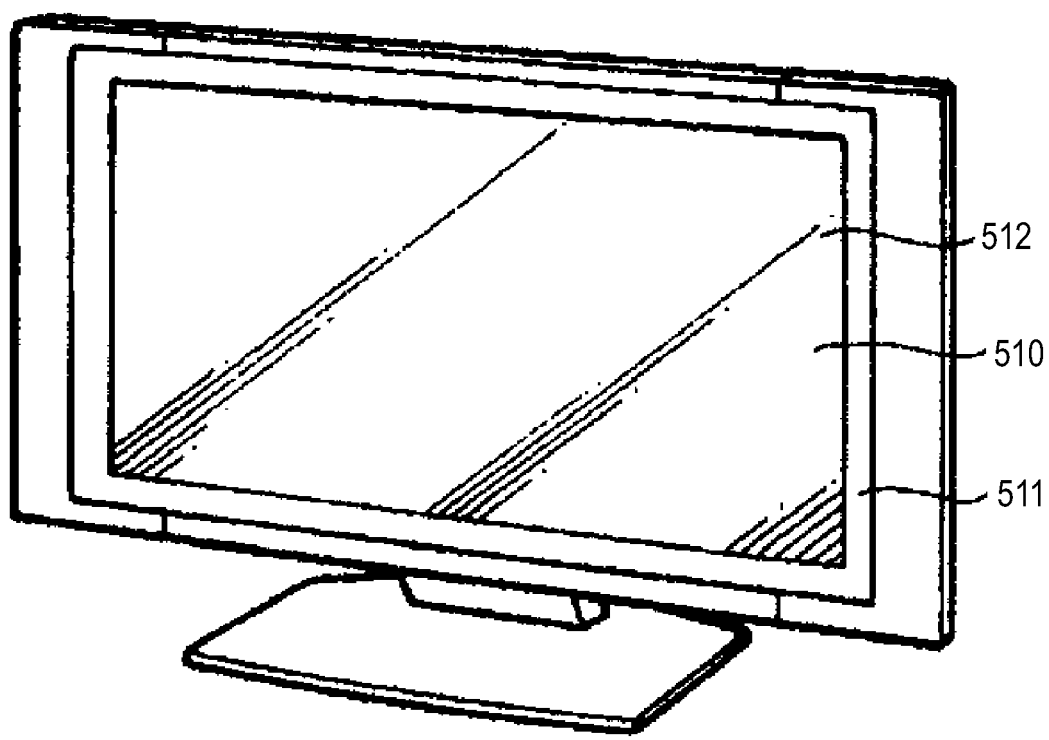
FIG. 26 is a perspective view illustrating the outer configuration of a television set to which the display panel according to the embodiments is applied.

FIG. 26 shows the appearance of a television set to which the display panel according to the above-mentioned embodiments is applied. The television set includes, for example, includes an image display screen unit 510 including a front panel 511 and a filter glass 512. The image display screen unit 510 is constructed by the display panel according to the above-mentioned embodiments or the like.

The display panel according to the above-mentioned embodiments or the like can be applied to electronic apparatuses in all the fields such as portable terminals such as a digital camera, a notebook personal computer, and a mobile phone, portable game machines, and video cameras, in addition to the television set. In other words, the display panel according to the above-mentioned embodiments or the like can be applied to electronic apparatuses of all the fields displaying an image.

Although the present disclosure is described above with reference to several embodiments, modified examples thereof, and application examples of the electronic apparatus, the present disclosure is not limited to the embodiments and the like and can be modified in various forms.

For example, in the above-mentioned embodiments and the like, the configuration of the capacitive element CH and the configuration of the capacitive element CL in each auxiliary driver unit 18, 78, or 88 are set to be equal to each other, but the present disclosure is not limited to this configuration. An example thereof will be described below in detail.

Figure 27:
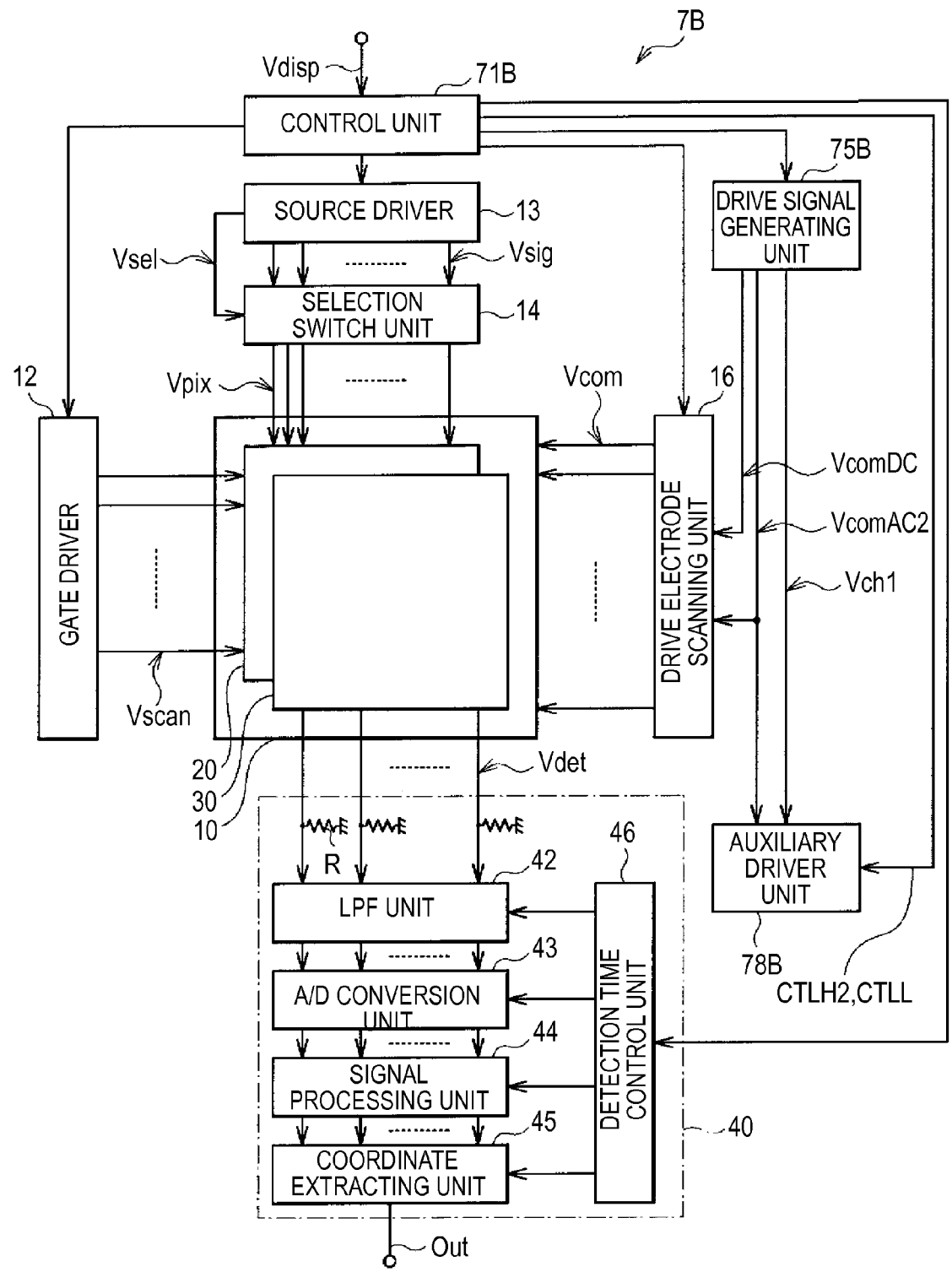
FIG. 27 is a block diagram illustrating a configuration example of a display panel according to a modified example.

FIG. 27 shows a configuration example of a display panel 7B according to this modified example. The display panel 7B includes a drive signal generating unit 75B, an auxiliary driver unit 78B, and a control unit 71B. The drive signal generating unit 75B generates a DC drive signal VcomDC, and AC drive signal VcomAC2, and a DC signal Vch1. That is, the drive signal generating unit 75B does not generate the voltage Vcl1, unlike the drive signal generating unit 75 according to the second embodiment. Similarly to the auxiliary driver unit 78 according to the second embodiment, the auxiliary driver unit 78B assists the driving operation of the drive signal generating unit 75B. At this time, the auxiliary driver unit 78B initializes the capacitive element CH using the DC signal Vch1 supplied from the drive signal generating unit 75B. The control unit 71B supplies control signals CTLH2 and CTLL to the auxiliary driver unit 78B.

Figure 28:
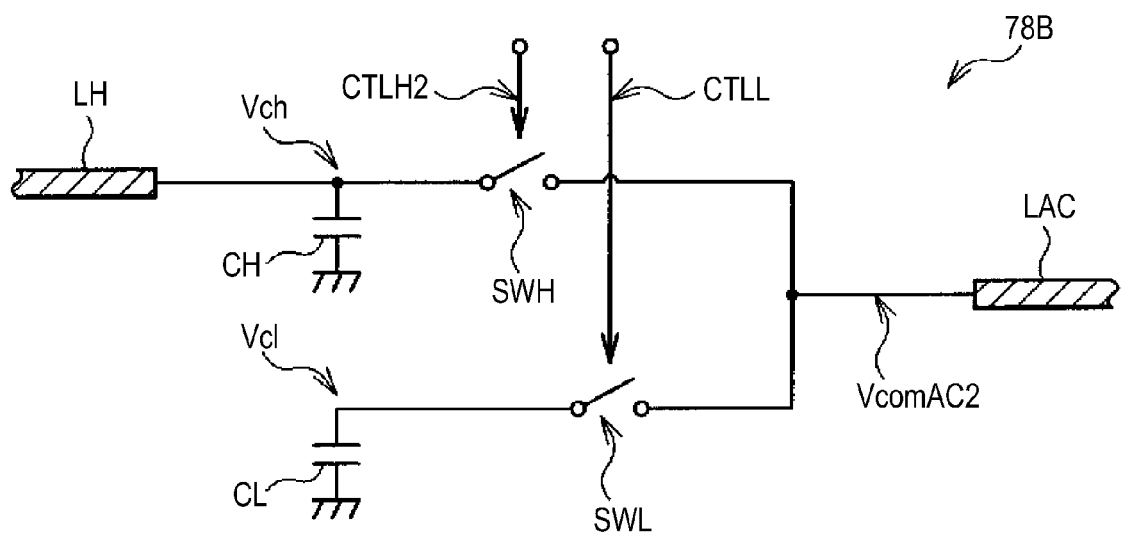
FIG. 28 is a circuit diagram illustrating a configuration example of an auxiliary driver unit shown in FIG. 27.

FIG. 28 shows a configuration example of the auxiliary driver unit 78B. In the auxiliary driver unit 78B, one end of the capacitive element CH is connected to one end of the switch SWH and is also connected to the line LH. On the other hand, one end of the capacitive element CL is connected to only one end of the switch SWL. That is, in the auxiliary driver unit 78B, the configuration of the capacitive element CH is different from the configuration of the capacitive element CL. Specifically, the auxiliary driver unit 78B combines the configuration (FIG. 22) of the capacitive element CH in the auxiliary driver unit 78 according to the second embodiment and the configuration (FIG. 13) of the capacitive element CL in the auxiliary driver unit 18.

Figure 29:
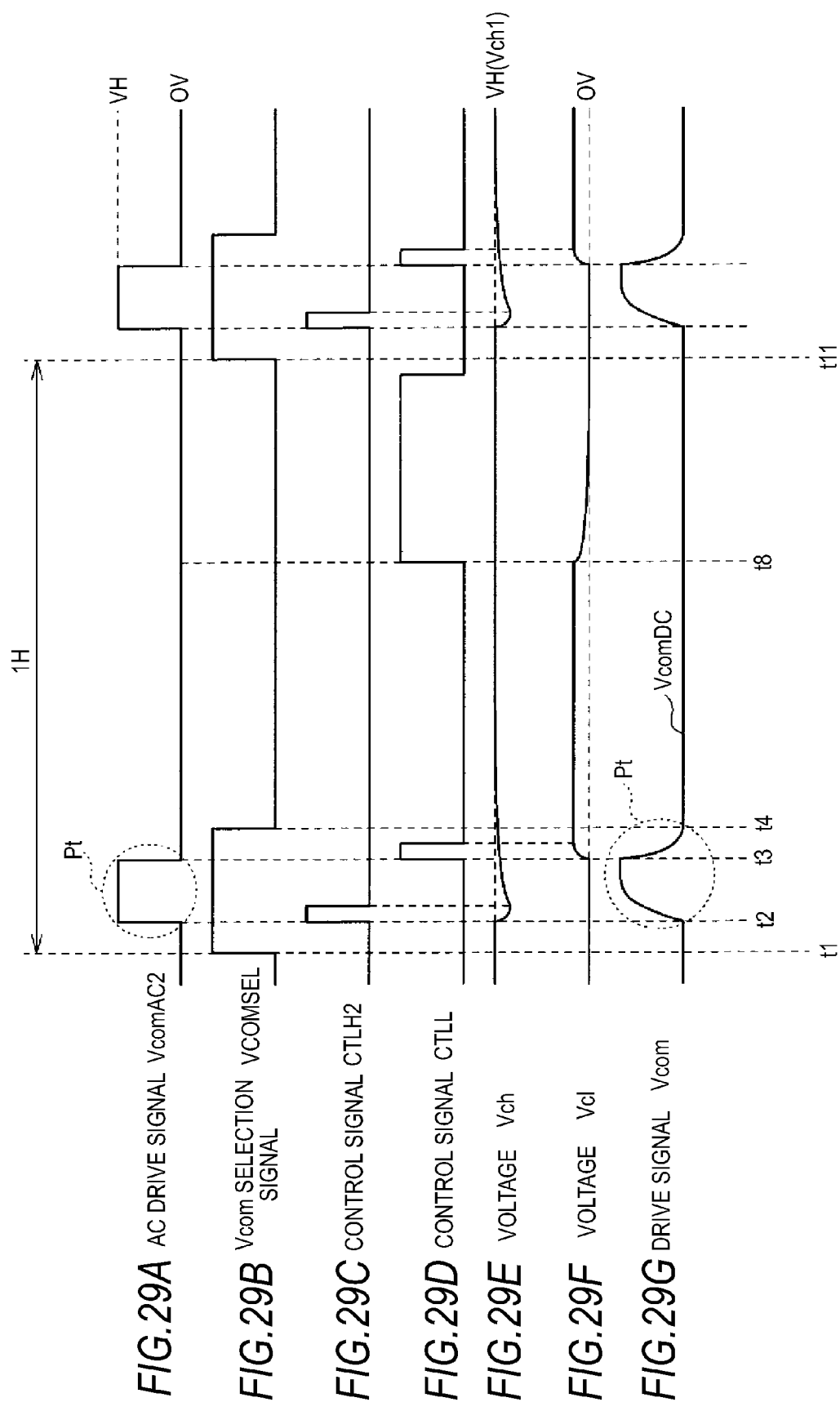
FIGS. 29A to 29G are timing waveform diagrams illustrating an operational example of the auxiliary driver unit shown in FIG. 28.

FIGS. 29A to 29G show a timing waveform example of a touch detecting operation in the display panel according to this modified example, where FIG. 29A represents the waveform of the AC drive signal VcomAC2 in the output of the drive signal generating unit 75B, FIG. 29B represents the waveform of the Vcom selection signal VCOMSEL, FIG. 29C represents the waveform of the control signal CTLH2, FIG. 29D represents eh waveform of the control signal CTLL2, FIG. 29E represents the waveform of the voltage Vch of the capacitive element CH, FIG. 29F represents the waveform of the voltage Vcl of the capacitive element CL, and FIG. 29G represents the waveform of the drive signal Vcom supplied to the drive electrode block B as a target of the touch detecting operation. In the auxiliary driver unit 78B, the capacitive element CH is initialized by being normally supplied with the DC signal Vch1 (the voltage VH) via the line LH, similarly to the auxiliary driver unit 78 according to the second embodiment, and the capacitive element CL is initialized by being supplied with 0 V via the line LAC in a predetermined period started from time t8, similarly to the auxiliary driver unit 18 according to the first embodiment.

By employing this configuration, it is possible to reduce the space for the line LL, compared with the display panel 7 according to the second embodiment, and it is possible to simplify the circuit operation of initializing the capacitive elements CH and CL, compared with the display panel 1 according to the first embodiment.

For example, in the above-mentioned embodiments and the like, as shown in FIG. 6, the drive electrodes COML are formed on the TFT substrate 21 and the pixel electrodes 22 are formed thereon with the insulating layer 23 interposed therebetween, but the present disclosure is not limited to this configuration. For example, the pixel electrode 22 may be formed on the TFT substrate 21 and the drive electrodes COML may be formed thereon with the insulating layer 23 interposed therebetween.

Figure 30:
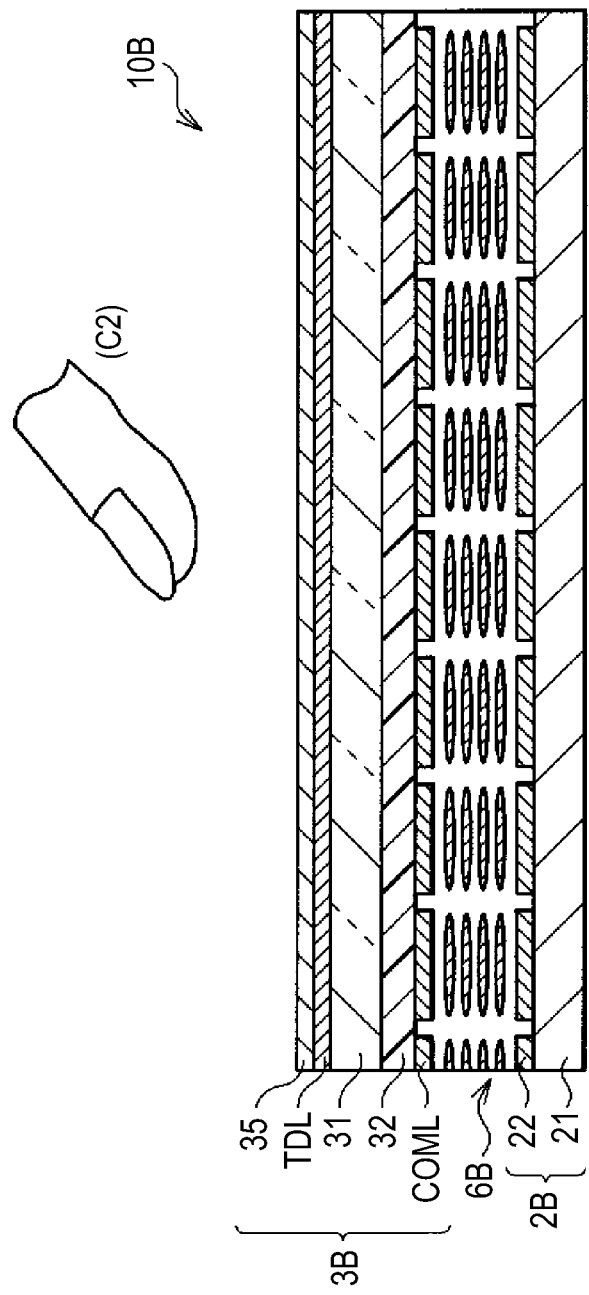
FIG. 30 is a cross-sectional view illustrating a schematic sectional structure of a display device with a touch detecting function according to a modified example.

For example, in the above-mentioned embodiments and the like, the liquid crystal display device using liquid crystal of a transverse electric field mode such as FFS or IPS and the touch detecting device are incorporated into a body. However, a liquid crystal display device using liquid crystal of various modes such as TN (Twisted Nematic), VA (Vertically Aligned), and ECB (Electric field Controlled Birefringence) and a touch detecting device may be incorporated into a body. When such liquid crystal is used, the display device with a touch detecting function can be constructed as shown in FIG. 30. FIG. 35 shows an example of a partial sectional structure of a display device with a touch detecting function 10D according to this modified example and shows a state where a liquid crystal layer 6B is interposed between a pixel substrate 2B and a counter substrate 3B. Names or functions of the other elements are the same as shown in FIG. 6 and description thereof will not be repeated. In this example, unlike the configuration shown in FIG. 6, the drive electrodes COML used both for display and for touch detection are formed on the counter substrate 3B.

For example, in the above-mentioned embodiments, the liquid crystal display device and the capacitance type touch detecting device are incorporated into a body to construct a so-called in-cell type, but the present disclosure is not limited to this configuration. For example, a so-called on-cell type may be employed in which a capacitance type touch detecting device is formed on the surface of a liquid crystal display device. In the on-cell type, for example, when noise of a display driving operation propagates from the liquid crystal display device to the touch detecting device, the noise can be reduced by driving the display panel as described in the above-mentioned embodiments, and it is thus possible to suppress the lowering of the touch detection accuracy.

For example, in the above-mentioned embodiments, the display device employs the liquid crystal device, but the present disclosure is not limited to this configuration. For example, EL (Electroluminescence) device may be employed.

The present disclosure may be implemented as the following configurations.

(1) A display panel including: display elements; a plurality of drive electrodes; one or more touch detecting electrodes that form a capacitor along with the corresponding drive electrode; a main driver unit that generates a basic drive signal including a pulse part supplied to the drive electrodes; and a first auxiliary driver unit that includes a capacitive element and that exchanges electric charges between the capacitive element and the drive electrodes in synchronization with the pulse part.

(2) The display panel according to (1), wherein the first auxiliary driver unit further includes a first switch that controls the exchange of electric charges between the capacitive element and the drive electrode, wherein the pulse part changes between two voltage levels, and wherein the first switch is turned on at the time corresponding to the rising or falling of the pulse part.

(3) The display panel according to (2), wherein the pulse part changes from a voltage of a first level to a voltage of a second level, and wherein the capacitive element is set to a voltage of a third level previously determined depending on the voltage of the second level in a period in which the first switch is turned off.

(4) The display panel according to (3), wherein the basic drive signal includes a DC part which is maintained at the voltage of the third level in a period other than the period in which the pulse part appears, and wherein the first switch is also turned on in the period in which the DC part appears in the basic drive signal.

(5) The display panel according to (3), further including a voltage supply unit that generates and supplies the voltage of the third level to the capacitive element.

(6) The display panel according to (3), further including a voltage generating unit that generates the voltage of the third level, wherein the first auxiliary driver unit further includes a voltage supply switch that controls the supply of the voltage of the third level, which is generated by the voltage generating unit, to the capacitive element.

(7) The display panel according to (6), wherein the voltage supply switch is turned on in a period in which the first switch is turned off.

(8) The display panel according to any one of (3) to (7), wherein the voltage of the third level is at the same voltage level as the voltage of the second level.

(9) The display panel according to any one of (3) to (7), wherein the voltage of the third level is higher than the voltage of the second level when the voltage of the second level is higher than the voltage of the first level, and is lower than the voltage of the second level when the voltage of the second level is lower than the voltage of the first level.

(10) The display panel according to any one of (2) to (9), wherein the first switch is turned on at the same time as or just before the rising of the pulse part or at the same time as or just before the falling of the pulse part.

(11) The display panel according to any one of (1) to (10), wherein the plurality of drive electrodes are formed to extend in a predetermined direction and are arranged to be perpendicular to the predetermined direction, wherein the main driver unit is disposed in the vicinity of the drive electrode which is disposed at one end of each of the plurality of drive electrodes, and wherein the first auxiliary drive unit is disposed in the vicinity of the drive electrode which is disposed at the other end thereof.

(12) The display panel according to any one of (1) to (11), further including a scanning unit that supplies the pulse part of the basic drive signal to the plurality of drive electrodes at every predetermined number of drive electrodes, wherein the capacitance value of the capacitive element is less than or equal to ten times the capacitance value of the predetermined number of drive electrodes.

(13) The display panel according to any one of (1) to (12), further including a second auxiliary driver unit that includes a capacitive element and a second switch controlling exchange of electric charges between the capacitive element and the drive electrodes, wherein the second switch is turned on at the time other than the time at which the first switch is turned on out of the rising time and the falling time of the pulse part.

(14) The display panel according to any one of (1) to (13), wherein each display element includes a liquid crystal layer, and a pixel electrode that is formed between the liquid crystal layer and the corresponding drive electrode or is formed to face the liquid crystal layer with the corresponding drive electrode interposed therebetween.

(15) The display panel according to (14), wherein the capacitive element includes an electrode formed in the same layer as the drive electrodes and an electrode formed in the same layer as the pixel electrodes.

(16) The display panel according to (14) or (15), wherein each display element further includes a pixel transistor, and wherein the capacitive element includes an electrode formed in the same layer as the gate electrode of the pixel transistor.

(17) The display panel according to any one of (1) to (13), wherein each display element includes a liquid crystal layer, and a pixel electrode that is disposed to face the corresponding drive electrode with the liquid crystal layer interposed therebetween.

(18) A driver circuit including a capacitive element, wherein electric charges are exchanged between the capacitive element and a drive electrode in synchronization with a pulse part, which is supplied to the drive electrode, of a basic drive signal.

(19) A driving method of supplying a pulse part of a basic drive signal to a drive electrode and exchanging electric charges between a capacitive element and the drive electrode in synchronization with the pulse part.

(20) An electronic apparatus including: a display panel; and a control unit that controls an operation of the display panel, wherein the display panel includes display elements, a plurality of drive electrodes, one or more touch detecting electrodes that form a capacitor along with the corresponding drive electrode, a main driver unit that generates a basic drive signal including a pulse part supplied to the drive electrodes, and a first auxiliary driver unit that includes a capacitive element and that exchanges electric charges between the capacitive element and the drive electrodes in synchronization with the pulse part.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A display panel comprising:
   display elements;
   a plurality of drive electrodes;
   one or more touch detecting electrodes that form a capacitor along with the corresponding drive electrode;
   a main driver unit that generates a basic drive signal including a pulse part supplied to the drive electrodes;
   a first auxiliary driver unit that includes a capacitive element and that exchanges electric charges between the capacitive element and the drive electrodes in synchronization with the pulse part; and
   a voltage supply unit,
   wherein the first auxiliary driver unit further includes a first switch that controls the exchange of electric charges between the capacitive element and the drive electrode,
   wherein the pulse part changes between two voltage levels,
   wherein the first switch is turned on at a time corresponding to a rising or falling of the pulse part,
   wherein the pulse part changes from a voltage of a first level to a voltage of a second level,
   wherein the capacitive element is set, in a period in which the first switch is turned off, to a voltage of a third level that is previously determined depending on the voltage of the second level,
   wherein the voltage supply unit is configured to generate and supply the voltage of the third level to the capacitive element, and
   wherein the first auxiliary driver unit further includes a voltage supply switch configured to control the supply of the voltage of the third level, which is generated by the voltage supply unit, to the capacitive element.

2. The display panel according to claim 1, wherein the voltage supply switch is turned on in a period in which the first switch is turned off.

3. The display panel according to claim 1, wherein the voltage of the third level is at a same voltage level as the voltage of the second level.

4. The display panel according to claim 1, wherein the voltage of the third level is higher than the voltage of the second level when the voltage of the second level is higher than the voltage of the first level, and is lower than the voltage of the second level when the voltage of the second level is lower than the voltage of the first level.

5. The display panel according to claim 1, wherein the first switch is turned on at a same time as or just before the rising of the pulse part or at a same time as or just before the falling of the pulse part.

6. The display panel according to claim 1, wherein each of the drive electrodes extends in a predetermined direction, and the drive electrodes are arranged in a direction perpendicular to the predetermined direction,
   wherein the main driver unit is disposed in a vicinity of the drive electrode which is disposed at one end of each of the plurality of drive electrodes, and
   wherein the first auxiliary drive unit is disposed in the vicinity of the drive electrode which is disposed at the other end thereof.

7. The display panel according to claim 1, further comprising a scanning unit that supplies the pulse part of the basic drive signal to the plurality of drive electrodes at every predetermined number of drive electrodes in a drive electrode block,
   wherein a capacitance value of the capacitive element is less than or equal to ten times a capacitance value of a parasitic capacitance between the predetermined number of drive electrodes in the drive electrode block.

8. The display panel according to claim 1, further comprising a second auxiliary driver unit that includes a capacitive element and a second switch controlling exchange of electric charges between the capacitive element and the drive electrodes,
   wherein the second switch is turned on at a first time other than a second time at which the first switch is turned on out of the rising time and the falling time of the pulse part.

9. The display panel according to claim 1, wherein each display element includes
   a liquid crystal layer, and
   a pixel electrode that is formed between the liquid crystal layer and the corresponding drive electrode or is formed to face the liquid crystal layer with the corresponding drive electrode interposed therebetween.

10. The display panel according to claim 9, wherein the capacitive element includes an electrode formed in the same layer as the drive electrodes and an electrode formed in the same layer as the pixel electrodes.

11. The display panel according to claim 9, wherein each display element further includes a pixel transistor, and
    wherein the capacitive element includes an electrode formed in a same layer as a gate electrode of the pixel transistor.

12. The display panel according to claim 1, wherein each display element includes
    a liquid crystal layer, and
    a pixel electrode that is disposed to face the corresponding drive electrode with the liquid crystal layer interposed therebetween.

* * * * *